United States Patent [19]
Mimura

[11] Patent Number: 6,113,117
[45] Date of Patent: Sep. 5, 2000

[54] AUXILIARY STEERING GEAR FOR CARRIER INCORPORATING A CASTER WHEEL DEVICE

[75] Inventor: Yasuo Mimura, Tokyo, Japan

[73] Assignee: Maruishi Cycle Industries Ltd., Japan

[21] Appl. No.: 09/230,559

[22] PCT Filed: Oct. 8, 1997

[86] PCT No.: PCT/JP97/03628

§ 371 Date: Jan. 28, 1999

§ 102(e) Date: Jan. 28, 1999

[87] PCT Pub. No.: WO98/56638

PCT Pub. Date: Dec. 17, 1998

[30] Foreign Application Priority Data

Jun. 10, 1997 [JP] Japan ................................. 9-166667

[51] Int. Cl.[7] .................................................. B62B 3/00
[52] U.S. Cl. .................................. 280/47.11; 280/250.1; 280/755
[58] Field of Search ................................ 280/755, 250.1, 280/38, 39, 642, 646, 639, 47.11, 47.12, 47.131, 47.16; 180/6.28, 219

[56] References Cited

U.S. PATENT DOCUMENTS

| | | | |
|---|---|---|---|
| 3,610,646 | 10/1971 | Bobard | 280/6 H |
| 3,618,967 | 11/1971 | Sugiyama | 280/47.11 |
| 4,110,866 | 9/1978 | Ishii | 16/35 R |
| 4,181,190 | 1/1980 | Yang | 180/219 |
| 4,248,444 | 2/1981 | Johnson | 280/47.11 |
| 4,364,580 | 12/1982 | Shapcott | 280/266 |
| 4,549,624 | 10/1985 | Doman | 180/6.28 |
| 4,925,416 | 5/1990 | Oishi | 440/84 |
| 5,020,815 | 6/1991 | Harris et al. | 280/246 |
| 5,135,063 | 8/1992 | Kropf | 180/209 |
| 5,904,218 | 5/1999 | Watkins | 180/209 |
| 5,964,471 | 10/1999 | Copland | 280/47.11 |

FOREIGN PATENT DOCUMENTS

| | | |
|---|---|---|
| 2 647 152 | 11/1990 | France . |
| 28 43 348 | 4/1979 | Germany . |
| 61-130223 | 8/1986 | Japan . |
| 0589022 | 12/1993 | Japan . |
| 06086790 | 3/1994 | Japan . |
| 07116197 | 5/1995 | Japan . |
| 08182706 | 7/1996 | Japan . |

Primary Examiner—Paul N. Dickson
Assistant Examiner—Daniel Yeagley
Attorney, Agent, or Firm—Laubscher & Laubscher

[57] ABSTRACT

An auxiliary steering gear for a carrier comprising; a carrier body incorporating a main wheel, a caster wheel device including a sub wheel support device which connects a sub wheel to the carrier body while supporting the sub wheel so as to be freely rotatable about a horizontal axle and a vertical shaft, an inclining device for enabling inclining of the sub wheel in a transverse direction with respect to a direction of travel of the carrier body, and a remote operation device for remote operation of the inclining device, wherein the inclining device comprises an incline support device for inclinably connecting the caster wheel device to the carrier body by way of an incline support shaft which extends in the direction of travel of the carrier body, and a gear device for transmitting an incline drive force to incline the caster wheel device, and the gear device is set with a large gear ratio for reducing a reaction force due to external forces acting on the sub wheel, and the remote operation device is for remotely driving the gear device.

21 Claims, 21 Drawing Sheets

FIG.20
(A)
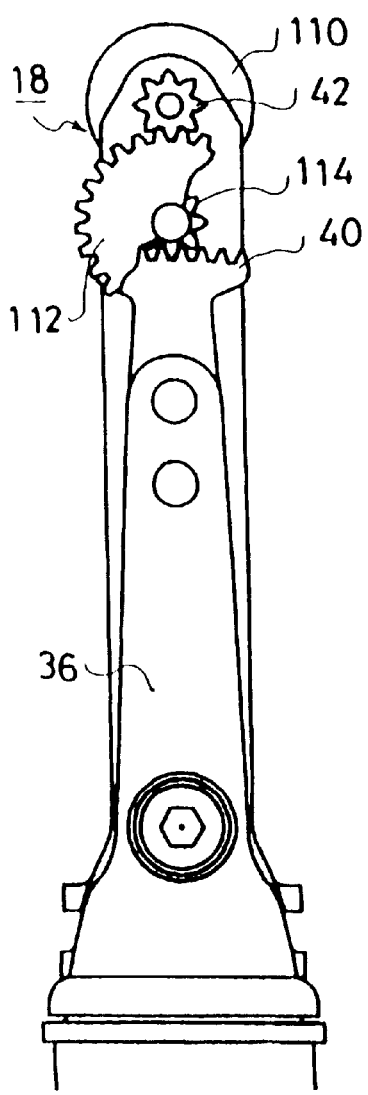
(B)
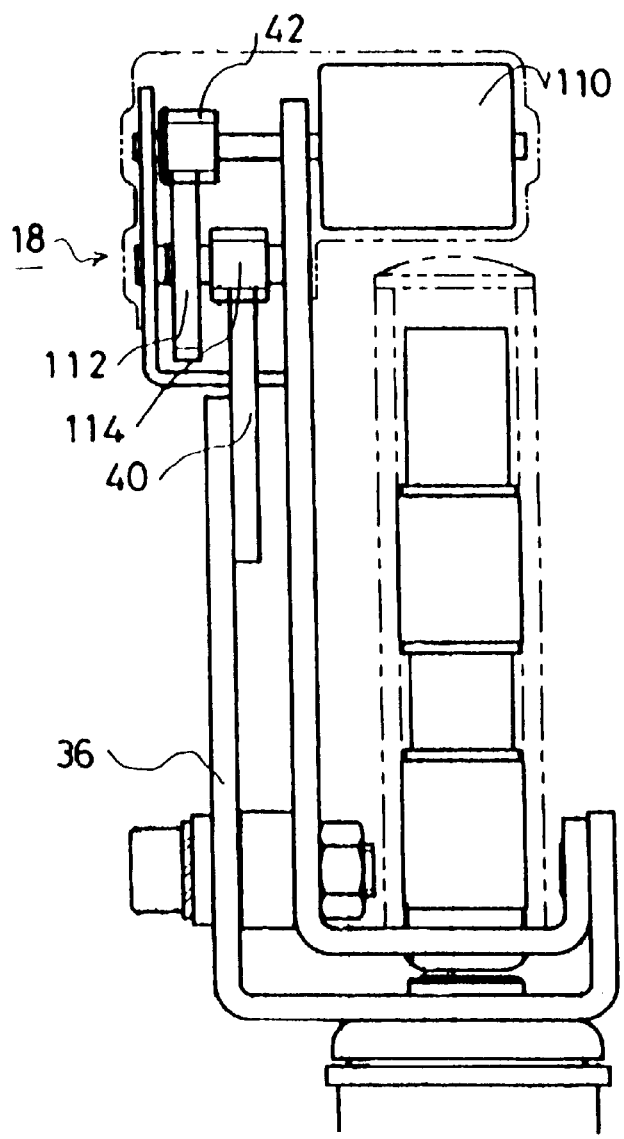

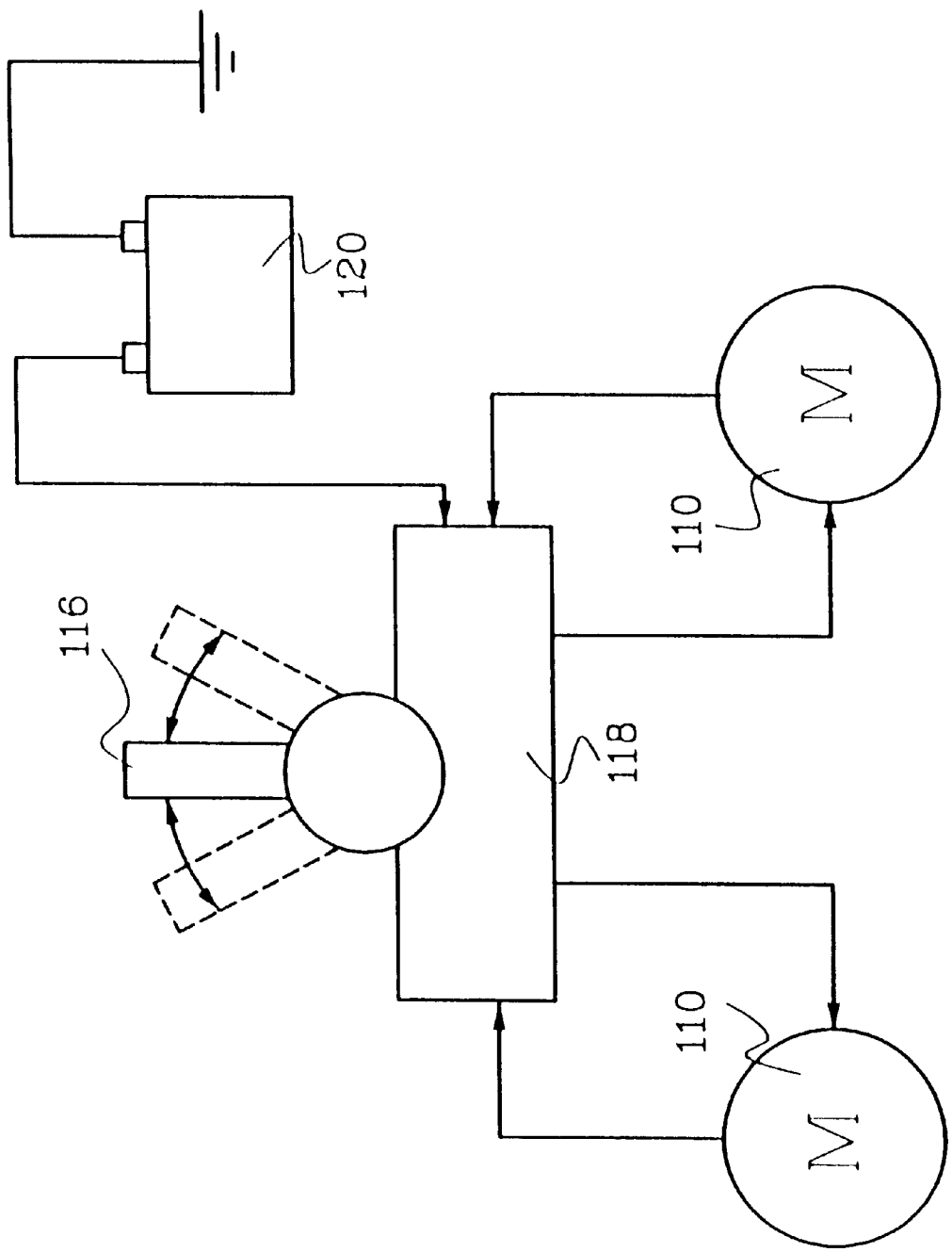

AUXILIARY STEERING GEAR FOR CARRIER INCORPORATING A CASTER WHEEL DEVICE

TECHNICAL FIELD

The present invention relates to an auxiliary steering gear for a carrier incorporating a caster wheel device, and in particular to technology for improving the straight line travel performance and steering performance of a carrier, by inclining a wheel in a transverse direction with respect to the direction of travel of the carrier.

BACKGROUND ART

A carrier, for example in the case of a wheel chair, is an appliance which is indispensable for moving a lower limb handicapped person.

However, with an outdoor path on which the wheel chair travels, since in general an incline is given to the surface to drain away water etc., the following problems arise.

That is to say, when a wheel chair travels on an inclined surface of a path, then due to gravity, a centripetal acceleration occurs in the direction of the downward incline of the path. Therefore, even if a uniform force acts on the wheel chair in the left and right directions so as to move the wheel chair in a straight line, the wheel chair turns in the direction in which the centripetal acceleration occurs, so that there is a drop in the straight line travel performance of the wheel chair. In this case, a person moving the wheel chair (the lower limb handicapped person in the case where the wheel chair is moved by the strength of the handicapped person themselves, or an assistant in the case where an assistant pushes the wheel chair from behind), must obtain balance by consciously changing the force in the left and right direction with respect to the direction of travel to make the wheel chair travel in a straight line. In the case where the incline angle of the path is only slight, then straight line travel performance of the wheel chair can be maintained with this method, however when the incline angle of the path is relatively large, it is extremely difficult to obtain the left and right balance. It is also difficult to advance the wheel chair while turning the wheel chair up towards the higher level of the slope.

Furthermore, when turning the wheel chair, with a conventional wheel chair it is necessary to create an opportunity to commence turning by operating a brake on one side, so that there is also the problem that an energy loss occurs whenever turning.

The above described problems with wheel chairs similarly occur with carriers including stretchers used in hospitals etc., or wagons and the like used for example in general households or restaurants.

As a device for solving this undesirable situation with carriers, an invention related to wheel chairs has been proposed by the inventor of the present application, in Japanese Unexamined Patent Publication No. 8-182706. That is to say, a caster wheel device attached to a lower portion of a carrier body is inclined in a transverse direction with respect to the direction of travel of the carrier by means of a remotely operated inclining device. Furthermore, the straight line travel performance of the carrier is improved by offsetting the turning force due to the slope with the turning force due to incline of the caster wheel device.

However with this inclining device, the construction is such that the caster wheel device is inclined using a screw connection. Hence while the reduction ratio can be made high, there is the disadvantage that mechanical efficiency is low. Therefore, the force required for inclining the caster wheel device is large and hence operability is poor.

DISCLOSURE OF THE INVENTION

The present invention takes into consideration the above heretofore problems, with the object of reconsidering the mechanism for inclining the caster wheel device, so that the caster wheel device can be inclined with a minimum force.

To achieve the aforementioned object, with the present invention, there is provided an auxiliary steering gear for a carrier incorporating a caster wheel device comprising; a carrier body incorporating a main wheel, a caster wheel device including a sub wheel and a sub wheel support device which essentially connects the sub wheel to the carrier body while supporting the sub wheel so as to be freely rotatable about a horizontal axle and a vertical shaft, an inclining device for enabling inclining of the sub wheel in a transverse direction with respect to a direction of travel of the carrier body, and a remote operation device for remote operation of the inclining device, wherein the inclining device comprises an incline support device for inclinably connecting the caster wheel device to the carrier body by means of an incline support shaft which extends in the direction of travel of the carrier body, and a gear device for transmitting an incline drive force to incline the caster wheel device, and the gear device is set with a large gear ratio for reducing a reaction force due to external forces acting on the sub wheel, and the remote operation device is for remotely driving the gear device.

With such a construction, when the carrier travels along an inclined surface, the remote operation device is operated to transmit an incline drive force to the gear device. As a result, the sub wheel of the caster wheel device inclines in the transverse direction with respect to the direction of travel of the carrier body about the incline support shaft. When the sub wheel inclines, a centripetal acceleration occurs in the incline direction and a turning force to turn the carrier in the incline direction is thus produced. Consequently, by inclining the sub wheel in the opposite direction to the inclined surface, the turning force due to the inclined surface is offset by the turning force due to the incline of the sub wheel, enabling an improvement in straight line travel performance of the carrier.

Furthermore, when the carrier is turned, if prior to turning the remote operation device is operated to incline the sub wheel, then a turning force is produced due to the incline of the sub wheel. Consequently, turning of the carrier can be commenced even without operating the brake on one side as heretofore, so that energy loss is avoided, and turning performance can be improved.

In this case, since the inclining device comprises a gear device for incline drive of the sub wheel, then compared to the screw connection as heretofore, mechanical efficiency is increased enabling the sub wheel to be inclined with a minimum force. Furthermore, with the gear device, since a large gear ratio is set in order to reduce the reaction force due to external forces acting on the sub wheel, then even if an external force acts on the sub wheel, the incline angle of the sub wheel is not changed.

Here, the construction may be such that the sub wheel support device comprises; a sub wheel support member for rotatably supporting the sub wheel via the horizontal axle, and a vertical shaft bearing device having the vertical shaft with one essentially connected to the support member and the other essentially connected to the carrier body, and a bearing member.

With such a construction, the sub wheel rotates about the horizontal axle by means of the sub wheel support member and also turns about the vertical shaft by means of the vertical shaft bearing device. Consequently the caster wheel device turns about the vertical shaft towards the direction of travel of the carrier body to realize turning performance, and also the sub wheel rotates about the horizontal axle, enabling a reduction in the travelling resistance of the carrier.

Furthermore, the construction may be such that the incline support device comprises; an extension member which is formed by extending one of the vertical shaft and the shaft support member of the vertical shaft bearing device essentially connected to the carrier body, and the extension member is inclinably connected to the carrier body, by means of the incline support shaft.

With such a construction, by changing the position of the incline support shaft for connecting the extension member to the carrier body, the lever ratio for inclining the sub wheel can be easily changed. Consequently setting of the degree of incline of the caster wheel device, and the necessary incline drive force can be easily performed, and hence freedom of design can be improved.

With the above construction, the construction may be such that the gear device comprises; a first gear mechanism provided on the caster wheel device or the extension member thereof, and a second gear mechanism provided on the carrier body for engaging with the first gear mechanism, and the remote operation device is a device for rotational drive of the second gear mechanism.

With such a construction, by appropriately setting the ratio of the lengths of the distance between the incline support shaft and the horizontal axle of the sub wheel, and the distance between the incline support shaft and the first gear mechanism, and/or appropriately setting the reduction ratio between the first gear mechanism and the second gear mechanism, the reaction force due to external forces acting on the sub wheel can be reduced. Consequently, even if an external force acts on the sub wheel, the incline angle of the sub wheel is not easily changed, thus enabling an auxiliary steering gear for a carrier, wherein erroneous operation is minimal.

Furthermore, the construction may be such that the second gear mechanism of the gear device is a pinion.

With such a construction, the reduction ratio between the first gear mechanism and the second gear mechanism can be made large, and hence the reaction to external forces acting on the sub wheel can be easily increased.

Moreover, with the present invention, there is provided an auxiliary steering gear for a carrier incorporating a caster wheel device comprising; a carrier body incorporating a main wheel, a caster wheel device including a sub wheel and a sub wheel support device which essentially connects the sub wheel to the carrier body while supporting the sub wheel so as to be freely rotatable about a horizontal axle and a vertical shaft, an inclining device for enabling inclining of the sub wheel in a transverse direction with respect to a direction of travel of the carrier body, and a remote operation device for remote operation of the inclining device, wherein the sub wheel support device comprises a sub wheel support member for rotatably supporting the sub wheel via the horizontal axle, and a vertical shaft bearing device having the vertical shaft with one effectively connected to the support member and the other effectively connected to the carrier body, and a bearing member, and the inclining device comprises an incline support device for inclinably connecting the caster wheel device to the carrier body by way of an incline support shaft which extends in the direction of travel of the carrier body, and a gear device for transmitting an incline drive force to incline the caster wheel device, and the incline support device comprises an extension member which is formed by extending one of the vertical shaft and the shaft support member of the vertical shaft bearing device essentially connected to the carrier body, and the extension member is inclinably connected to the carrier body, by means of the incline support shaft, and the gear device comprises a sector gear provided on the caster wheel device or the extension member thereof, and a pinion provided on the carrier body and engaged with the sector gear, and the remote operation device is a device for rotational drive of the pinion.

With such a construction, since the gear device comprises a pinion with a small pitch circle diameter and a sector gear with a large pitch circle diameter, then the reduction ratio can be made large with a compact construction.

Here the construction may be such that the remote operation device comprises an operating force applying device for converting the applied operating force into the incline drive force, and a transmission device for mechanically transmitting the converted incline drive force to the gear device.

With such a construction, since the operating force applied to the operating force applying device is mechanically transmitted to the gear device via the transmission device, the installation position for the operating force applying device can be freely determined, thus facilitating to apply to various carriers.

Furthermore, the construction may be such that the transmission device is a cable.

With such a construction, the operating force applying device can be used in common and can be adapted for various carriers by merely changing the length of the cable. Hence common use of components can be accelerated.

Alternatively, the construction may be such that the operating force applying device is a slider with one end of the cable secured thereto, and which slides approximately linearly, or is a rotation dial with one end of the cable secured thereto, and which is rotatably attached to the carrier body.

With such a construction, the operating force applying device is made up of a simple mechanism and hence the occurrence of faults can be reduced, and the reliability and durability of the operating force applying device can be improved.

Here, the operating force applying device may comprise an approximately cylindrical rotation drum with one end of the cable secured thereto, and which is rotatably attached to the carrier body, an operating lever secured integral with the rotation drum for applying an operating force, and a control device for controlling the operating direction of the operating lever to one direction.

With such a construction, the operating force applying device is made up of a simple mechanism, and hence the occurrence of faults can be reduced, and the reliability and durability of the operating force applying device can be improved. Moreover, since the operating direction of the operating lever is controlled to one direction by the control device, erroneous operation where the caster wheel device is inclined to the opposite side to the intended direction can be reduced, and hence operability improved.

With regards to this, the construction may be such that the control device comprises a stopper which passes through an aperture formed in the operating lever so that a tip portion thereof is engaged with a fixed aperture to thereby control the operation of the operating lever, and an urging device for urging the stopper towards the fixed aperture.

With such a construction, by having the stopper engage with the fixed aperture when for example the caster wheel device is at a neutral position, then when the caster wheel device returns to the neutral position from the inclined condition, over operation of the operating lever is prevented, enabling an improvement in operability.

Moreover, an incline portion inclined in one direction may be formed on the tip portion of the stopper.

With such a construction, in the case where the operating lever is operated in one direction, then due to the incline portion formed on the tip portion of the stopper, the stopper slides against the urging force of the urging device so that the tip portion of the stopper comes away from the fixed aperture. Furthermore, in the case where the operating lever is operated in the other direction, a tip end side wall of the stopper abuts against an inner wall of the fixed aperture, and hence a force to separate the stopper from the fixed aperture against the urging force of the urging device is not produced. Thus the operating direction of the operating lever is controlled. Here, in the case where it is desired to operate the operating lever in the other direction, then if the operating lever is pressed in the fixed aperture direction, then by the principle of levers, the tip end of the stopper separates from the fixed aperture. Then, if in this condition the operating lever is operated in the other direction, operation in the other direction is possible.

Alternatively, a through hole may be formed in the rotation drum so that the stopper passes through the through hole, and a guide may be provided in the through hole for controlling the sliding direction of the stopper.

With such a construction, since the sliding direction of the stopper is controlled by the guide, then a force operating perpendicular to the stopper is supported by the guide, so that deformation of the stopper can be prevented.

Furthermore, a grip made from a resilient material may be provided on the operating lever.

With such a construction, gripping of the operating lever is facilitated, and hence operability can be improved.

Moreover, the construction may be such that the remote operation device simultaneously remotely operates a plurality of the inclining devices connected to the carrier body.

With such a construction, even in the case where a plurality of caster wheel devices are attached to the carrier, the inclining operation for all of the caster wheel devices can be carried out simultaneously by a single remote operation device, and hence operability can be improved.

Here, the operating force applying device may comprise; a rotor rotatably secured to the carrier body with one end of the cable secured thereto, an operating lever secured integral with the rotor for applying an operating force, a ball rotatably inserted in an aperture formed in the rotor, and an urging device for urging the ball towards a fixed aperture such that when the operating lever is at a neutral position, a portion of the ball engages with the fixed aperture.

With such a construction, the operating force applying device is made up of a simple mechanism and hence the occurrence of faults can be reduced, and the reliability and durability of the operating force applying device can be improved. Moreover, since the ball engages with the fixed aperture when the operating lever is at a neutral position, a light interference is produced at the neutral position so that it is easy to know that the operating lever is at the neutral position. Consequently, return of the operating lever to the neutral position is facilitated, enabling an improvement in operability.

Furthermore, an engagement aperture may be formed in the operating force applying device such that the ball is engaged with the engagement aperture at a maximum operating condition of the operating lever to control an operating range of the operating lever.

With such a construction, the operating range of the operating lever is controlled, thus preventing excessively large forces from acting on the operating force applying device, so that the occurrence of faults can be prevented.

Moreover, the engagement aperture may be formed with an engagement start portion with a small diameter and an engagement finish portion with a large diameter.

With such a construction, when the operating lever attains the maximum operating condition, the ball can be smoothly guided into the engagement aperture, enabling smooth stopping of the operating lever.

Alternatively, the construction may be such that the transmission device is a link.

With such a construction, the operating force applying device can be used in common and can be adapted for various carriers by merely changing the link. Hence common use of components can be accelerated.

Furthermore, the construction may be such that the remote operation device controls an electric motor to thereby drive the second gear mechanism.

With such a construction, the inclining device is operated by electricity, and hence the burden on the operator is reduced.

Other objects, and aspects of the present invention will become apparent from the following description of embodiments given in conjunction with the appended drawings.

BRIEF DESCRIPTION OF THE DRAWINGS

FIG. 20 shows an other embodiment of an inclining device shown in FIG. 1, (A) being a front view and (B) being a cut away side view; and FIG. 21 is a system diagram showing a control system for the inclining device shown in FIG. 20.

BEST MODE FOR CARRYING OUT THE INVENTION

Figure 1:
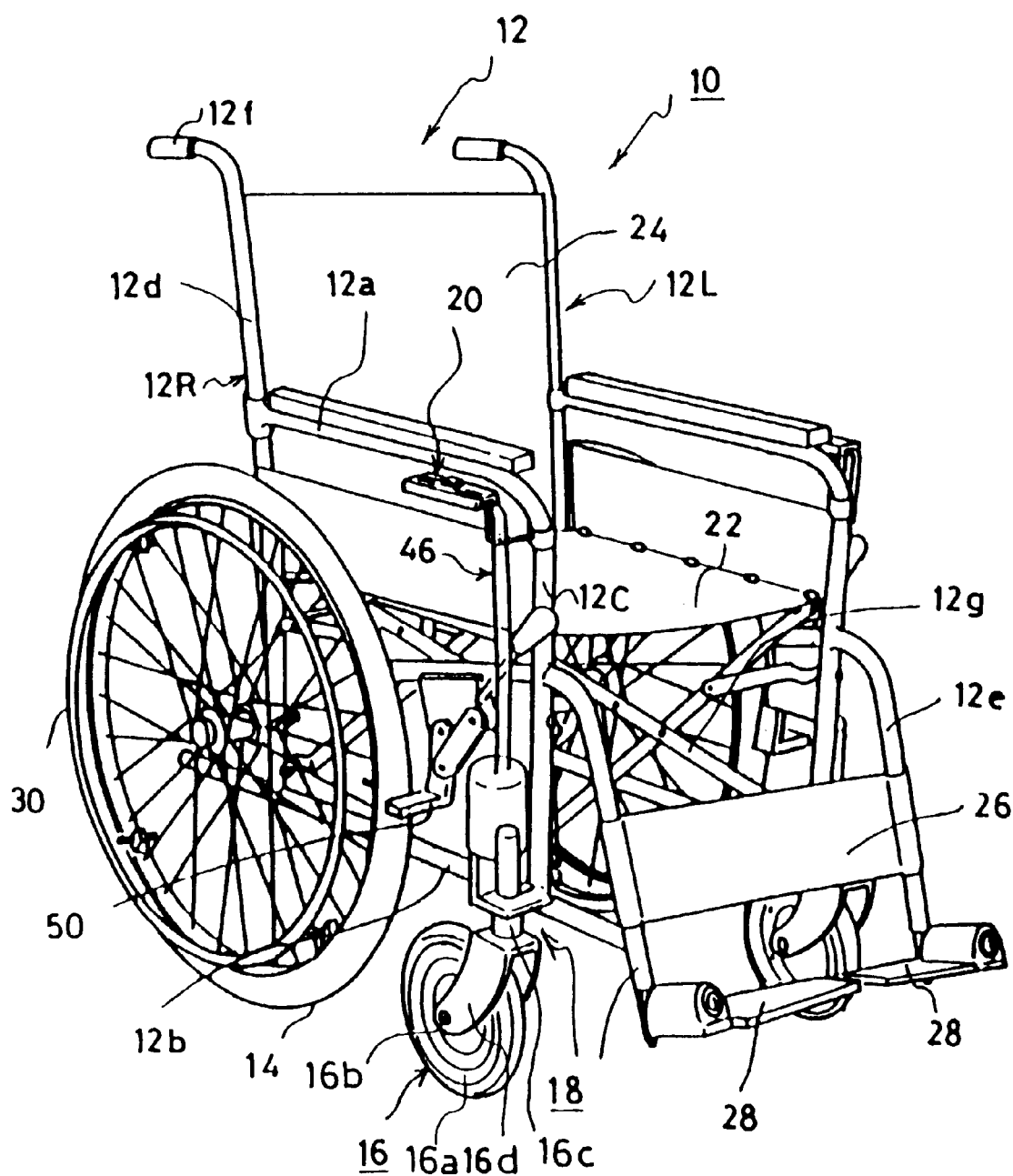
FIG. 1 is a perspective view of a wheel chair according to a first embodiment of the present invention.

FIG. 1 shows an overall construction of a first embodiment where an auxiliary steering gear for a carrier according to the present invention is applied to a wheel chair, being one type of carrier.

That is to say, a wheel chair 10 comprises a carrier body 12 serving as a frame, main wheels 14 being the drive wheels, caster wheel devices 16, inclining devices 18, and controllers 20.

The carrier body 12 is made up of a left and right pair of frames 12L, 12R, which each comprise a top pipe 12a, a base pipe 12b, a front pipe 12c, a back pipe 12d and a leg pipe 12e. The top pipe 12a and the base pipe 12b each extend with their longitudinal axes approximately horizontal. The front pipe 12c extends with its longitudinal axis approximately vertical, with an upper end portion thereof connected to a front end portion of the top pipe 12a, and a lower end portion thereof connected to a front end portion of the base pipe 12b. The back pipe 12d extends with its longitudinal axis approximately vertical, with a lower end portion thereof connected to a rear end portion of the base pipe 12b, and a central portion thereof connected to a rear end portion of the top pipe 12a. A grip 12f for an assistant to push the wheel chair 10, is formed on an upper end of the back pipe 12d. The leg pipe 12e extends in a direction such that the longitudinal axis thereof makes a predetermined angle to the vertical, and is connected to a front face central portion of the front pipe 12c. Furthermore, the left and right pair of frames 12L, 12R are connected by means of X-shaped cross rods 12g with a pin connected central portion, enabling folding at the time of carrying the wheel chair 10.

A seat 22 and a back rest 24 are slung between the left and right pair of frames 12L, 12R. A leg rest 26 for supporting the legs is slung between the leg pipes 12e at a central portion thereof, and two foot plates 28 for taking the feet are attached to the lower end portions of the leg pipes 12e.

The main wheels 14 are rotatably attached to the lower portions of the back pipes 12d. Hand rims 30 are concentrically attached to the main wheels 14 so that a person seated in the wheel chair 10 can rotate the main wheels 14 by means of the hand rims 30, and thereby move themselves.

The caster wheel device 16 comprises a sub wheel 16a, and a yoke 16d which functions as a sub wheel support member for essentially connecting the sub wheel 16a to the lower portion of the front pipe 12c while supporting the sub wheel 16a so as to be freely rotatable about a horizontal axle 16b and a vertical shaft 16c. Moreover, the sub wheel 16a turns about the vertical shaft 16c according to the direction of travel of the wheel chair 10, so that the direction of the sub wheel 16a changes.

Figure 2:
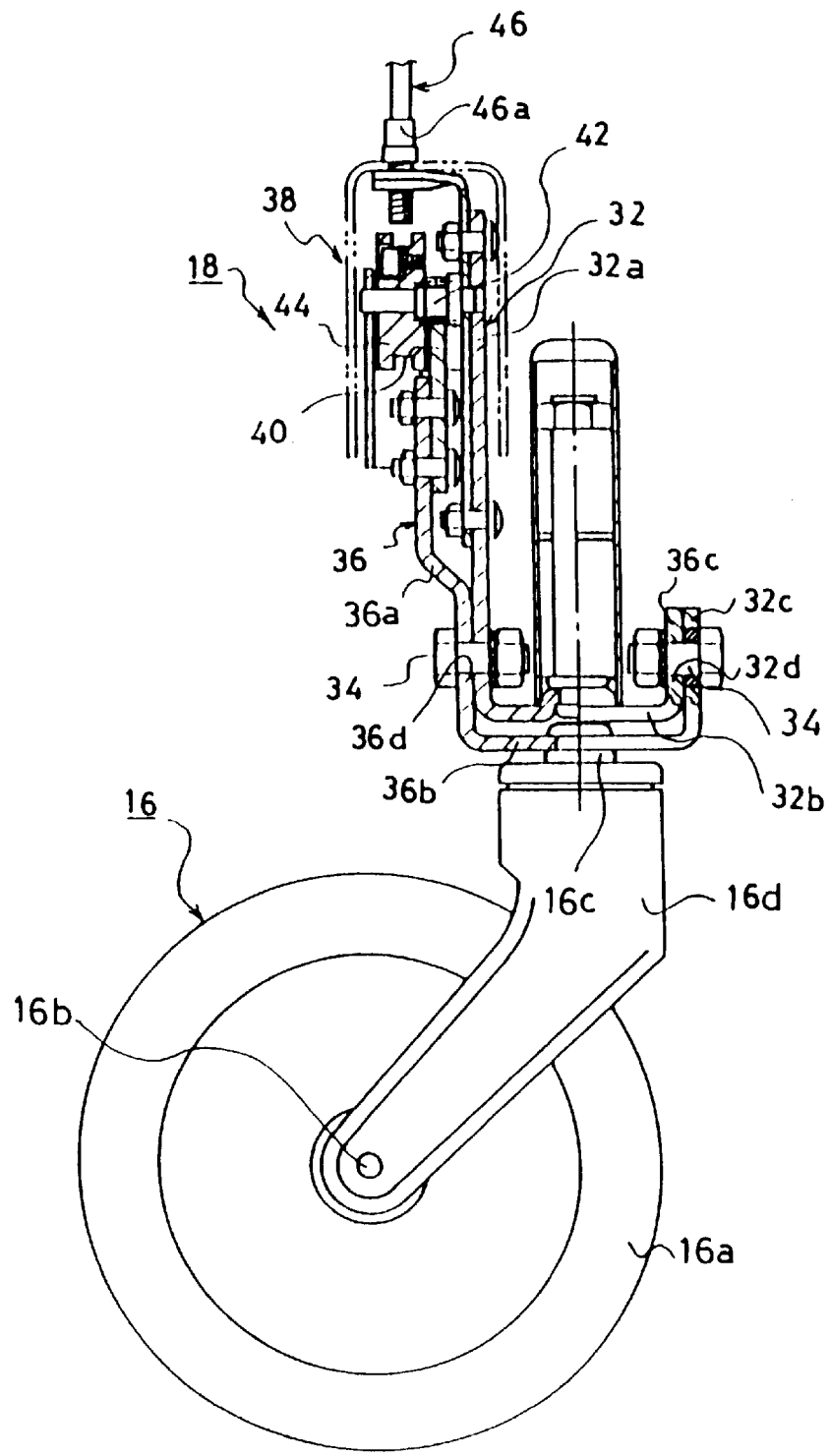
FIG. 2 is a cross-sectional view of an inclining device shown in FIG. 1.

The inclining device 18 inclines the sub wheel 16a in the transverse direction with respect to the direction of travel of the wheel chair 10. That is to say, the inclining device 18, as shown in FIG. 2, comprises a fixed arm 32, a movable arm 36 serving as an inclining support device, and a gear device 38 serving as an inclining mechanism. The fixed arm 32 is attached to a lower portion of the front pipe 12c of the carrier body 12. The movable arm 36 is located on a lower part of the fixed arm 32, and is attached so as to be freely inclinable with respect to the fixed arm 32 about an incline support shaft 34. The incline support shaft 34 extends in the direction of travel of the carrier body 12, and the gear device 38 inclines the movable arm 36.

The fixed arm 32 comprises a securing member 32a, a horizontal member 32b, and a vertical member 32c. The securing member 32a is secured to a lower portion of the front pipe 12c. The horizontal member 32b extends in a substantially horizontal direction from a lower end portion of the securing member 32a. The vertical member 32c extends in a substantially vertical direction from an end portion of the horizontal member 32b.

The movable arm 36 comprises a first vertical member 36a, a horizontal member 36b, and a second vertical member 36c. The horizontal member 36b extends in a substantially horizontal direction from a lower end of the first vertical member 36a. The second vertical member 36c extends in a substantially vertical direction from an end of the horizontal member 36b. Furthermore, the movable arm 36 is connected so as to be freely inclinable with respect to the fixed arm 32, by means of the incline support shaft 34 which passes through support shaft through holes 32d formed in the securing member 32a and the vertical member 32c of the fixed arm 32, and support shaft through holes 36d formed in the first vertical member 36a and the second vertical member 36c of the movable arm 36.

Figure 3:
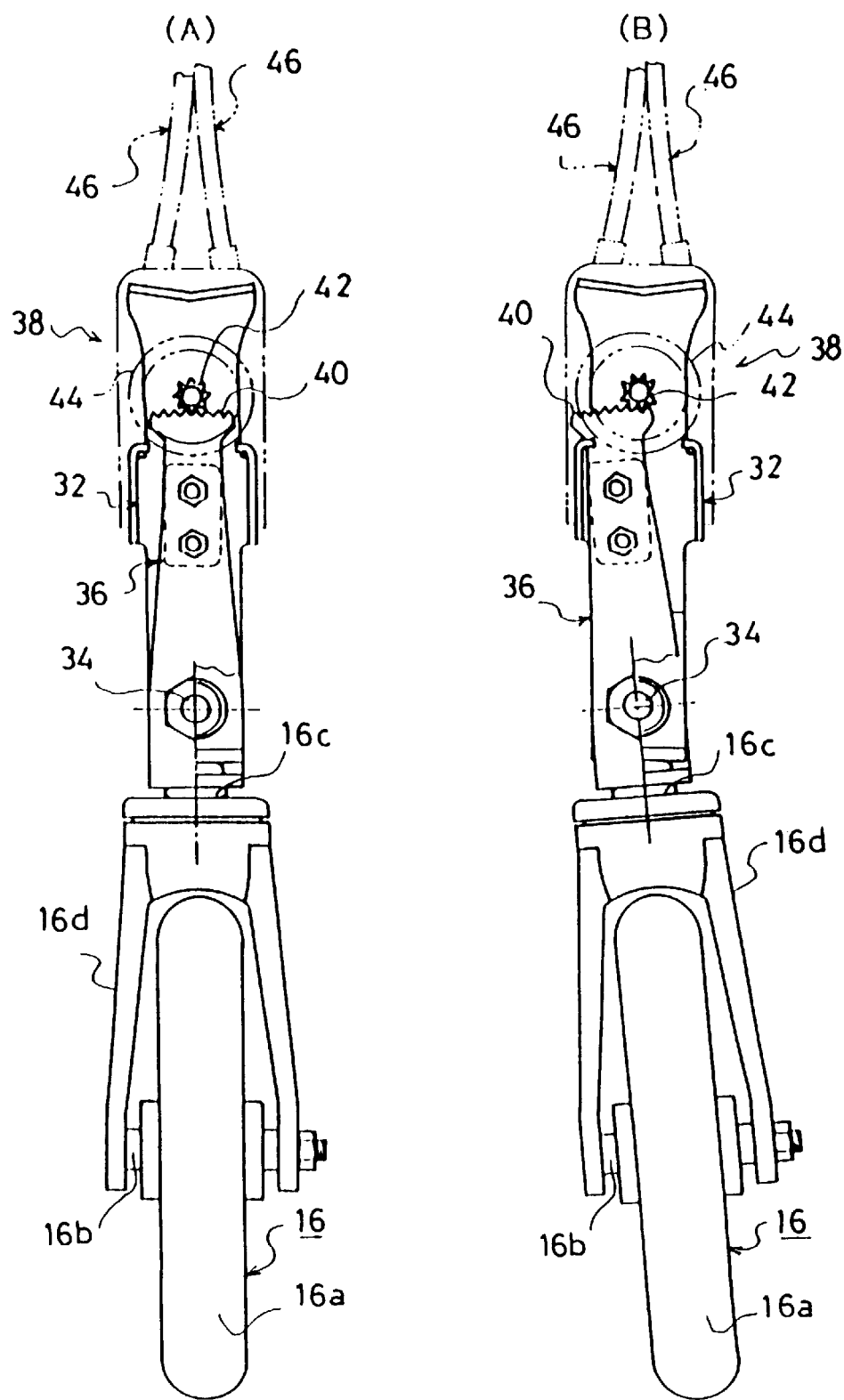
FIG. 3 shows a front view of the inclining device shown in FIG. 1, (A) being a view of a condition in a neutral position, and (B) being a view of a condition in an inclined position.

The gear device 38, as shown in FIG. 3, comprises; a sector gear 40 serving as a first gear mechanism provided on an upper end portion of the movable arm 36, a pinion 42 serving as a second gear mechanism engaged with the sector gear 40, and a pulley 44 integrally attached to the pinion 42.

The caster wheel device 16 is attached to the horizontal member 36b of the a movable arm 36 by means of a bearing device (not shown in the figures) serving as a vertical shaft bearing device. With the bearing device the construction is such that a bearing member supports the vertical shaft 16c of the caster wheel device 16. Consequently, in essence, the movable arm 36 constitutes an extension member of the bearing device.

Figure 4:
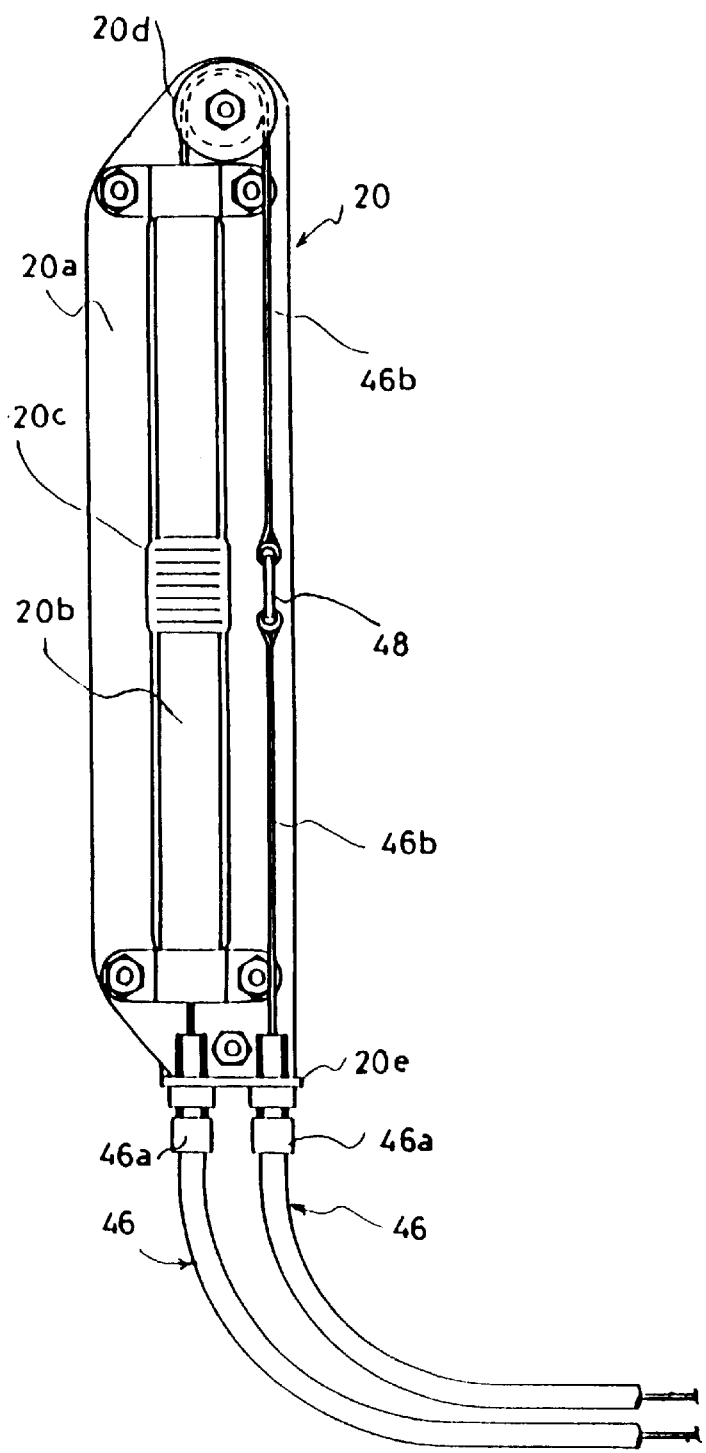
FIG. 4 is a detailed plan view of a controller shown in FIG. 1.

As shown in FIG. 4, the controller 20 serving as a device for applying an operating force for executing remote operation of the gear device 38, comprises a base plate 20a, a guide pipe 20b, a slider 20c, a pulley 20d, and a cable securing fitting 20e. The base plate 20a is attached to each of the left and right top pipes 12a. The guide pipe 20b is attached substantially horizontally to an upper part of the base plate 20a. The slider 20c is slidably engaged with the guide pipe 20b. The pulley 20d is rotatably attached to one side of the base plate 20a. The cable securing fitting 20e is attached to the other side of the base plate 20a, and secures one end of a control cable 46 serving as a transmission device.

The remote operation device is constructed including the controller 20 and the control cable 46.

As shown in FIG. 2, and FIG. 4, opposite ends of outer tubes 46a of the two control cables 46 for remote operation of the inclining device 18 are each connected to the upper end of the fixed arm 32 and to the cable securing fitting 20e of the controller 20. An inner wire 46b which slides inside the outer tubes 46a is wound around the pulley 44 of the inclining device 18 and the pulley 20d of the controller 20. The inner wire 46b is secured to the slider 20c of the controller 20, and opposite ends thereof are linked by a wire connector 48 to give an endless wire. The construction is such that the tension on the inner wire 46b can be adjusted by the wire connector 48.

Here, with the present embodiment, the inclining device 18 is constructed such that the sub wheel 16a is inclined within a range of approximately 5° to the left and the right with respect to the perpendicular direction of the wheel chair 10. Furthermore, while not described above, numeral 50 in FIG. 1 denotes a brake which is independently provided for each of the left and right main wheels 14.

Next is a description of the operation of the auxiliary steering gear for a carrier according to the first embodiment.

When the wheel chair 10 travels along an even path, if the slider 20c of the controller 20 is in the neutral position, then as shown in FIG. 3 (A), the pinion 42 of the inclining device 18 is engaged approximately at the center of the sector gear 40, and the incline angle of the sub wheel 16a is approximately zero. That is to say, this condition is the straight line travel condition of the wheel chair 10.

When the wheel chair 10 travels along an inclined surface, that is to say a path where the right side with respect to the direction of travel is lower, the slider 20c of the controller 20 is slid in one direction. Then, the inner wire 46b secured to the slider 20c slides inside the outer tubes 46a so that the pulley 44 of the inclining device 18 is rotated in accordance with the operating amount of the slider 20c. When the pulley 44 rotates, then as shown in FIG. 3 (B), the pinion 42 rotates as one with the pulley 44 so that the engagement position of the sector gear 40 which engages with the pinion 42 changes. Consequently, the movable arm 36 inclines relative to the fixed arm 32 about the incline support shaft 34 so that the sub wheel 16a inclines.

When the sub wheel 16a inclines as shown in FIG. 3 (B), a centripetal acceleration occurs in the sub wheel 16a to the left in the figure, so that a turning force which turns the wheel chair 10 to the left in the figure occurs. Therefore the turning force to the right due to the right side down inclined surface is offset by the turning force to the left due to the incline of the sub wheel 16a, so that the straight line travel performance of the wheel chair 10 is maintained. That is to say, even though a uniform force is applied to the left and right main wheels 14 of the wheel chair 10, the wheel chair 10 does not turn towards the lower side of the path, but travels straight ahead.

On the other hand, when for example the wheel chair 10 travels along a path where the left side with respect to the direction of travel is lower, the slider 20c of the controller 20 is slid in the other direction. Then, then as with the beforementioned action, the sub wheel 16a inclines in the opposite direction, and due to the centripetal acceleration occurring to the right in the figure, a turning force which turns the wheel chair 10 to the right is produced. Consequently, the turning force to the left due to the left side down inclined surface is offset by the turning force to the right due to the incline of the sub wheel 16a, so that the straight line travel performance of the wheel chair 10 is maintained.

Here, the turning force due to the incline of the sub wheel 16a is proportional to the incline angle of the sub wheel 16a. Therefore the operating amount of the slider 20c of the controller 20 can be appropriately changed in accordance with the incline angle of the path along which the wheel chair 10 travels.

Moreover, with such an action, the incline angle of the sub wheel 16a can be adjusted not only to suit the incline condition of the path along which the wheel chair 10 travels, but also for example to correct a lowering of the straight line travel performance of the wheel chair 10 attributable to an imbalance between the left and right.

Furthermore, since the incline angle of the sub wheel 16a is fixed by engagement of the pinion 42 with the sector gear 40 of the inclining device 18, then even if an external force acts on the sub wheel 16a so that a reaction force is produced, the incline condition of the sub wheel 16a is not compromised.

On the other hand, when the wheel chair 10 is to be turned, if the slider 20c of the controller 20 is operated prior to turning to incline the sub wheel 16a, then a turning force is produced due to the incline. Consequently, turning of the wheel chair 10 can be commenced with no need of operating the brake on one side as heretofore, so that as well as avoiding a loss of energy, turning characteristics can be improved.

Figure 5:
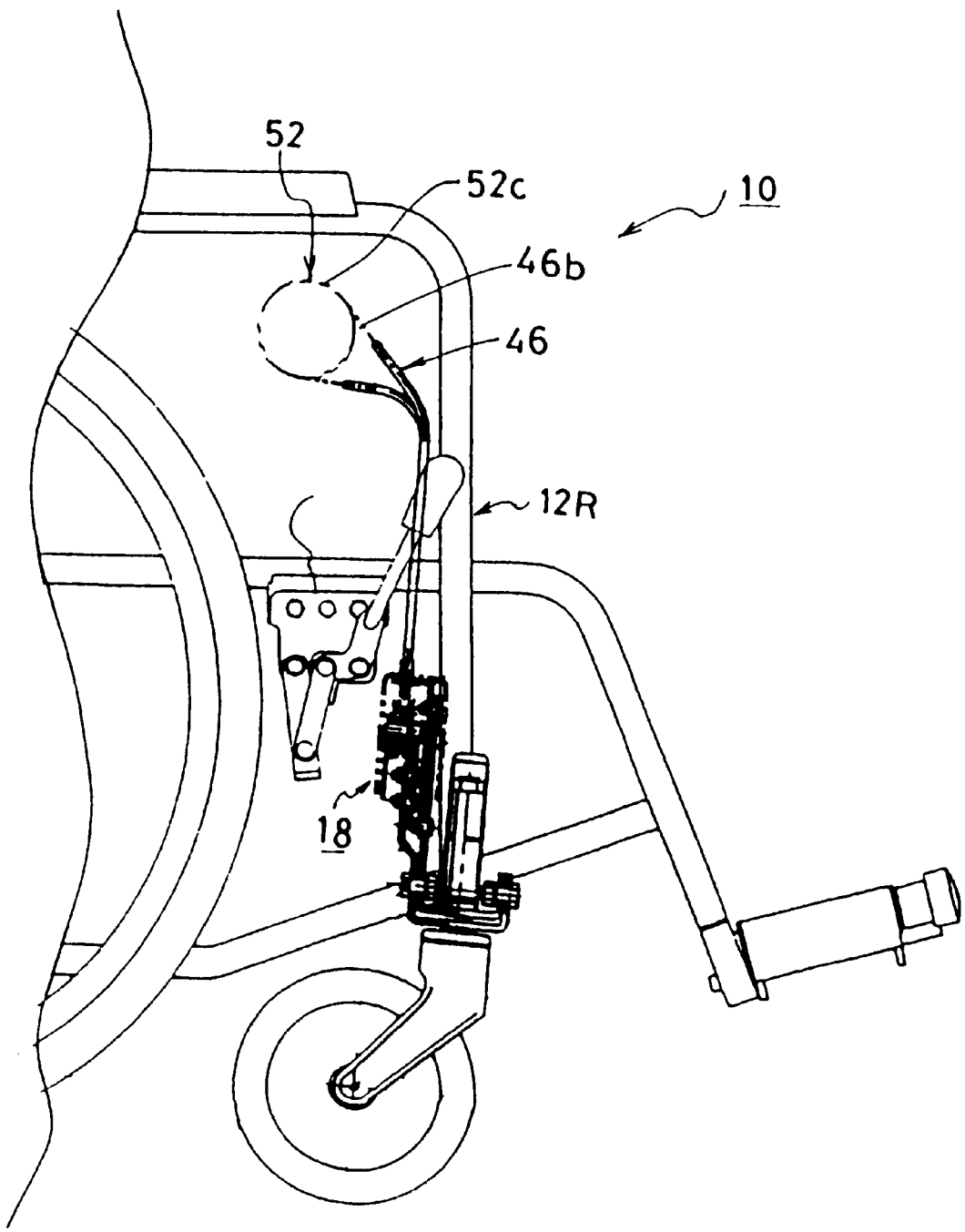
FIG. 5 is a side view showing a front portion of a wheel chair according to a second embodiment of the present invention.
Figure 6:
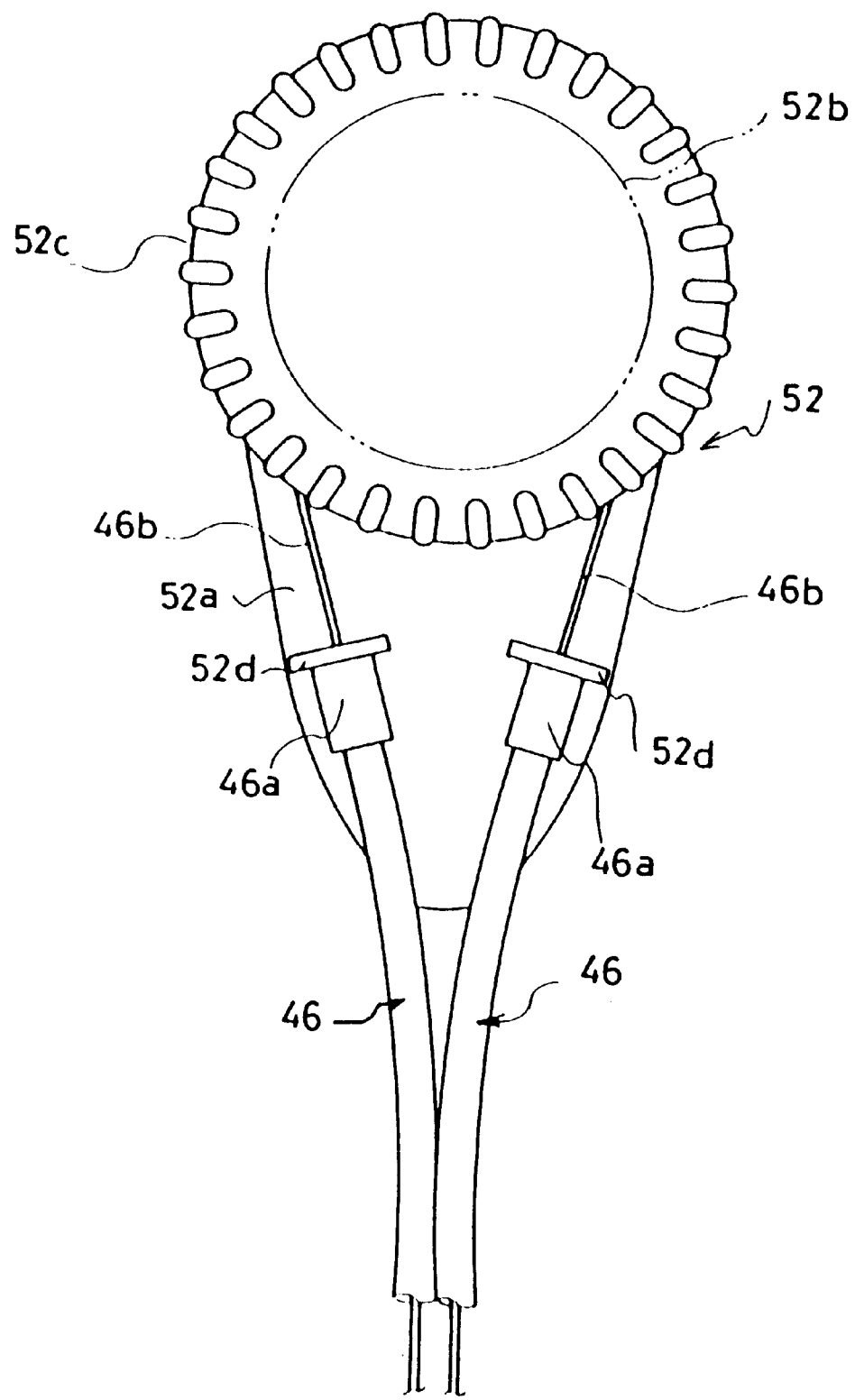
FIG. 6 is a detailed side view of a controller shown in FIG. 5.

FIG. 5 and FIG. 6 show a second embodiment of the auxiliary steering gear for a carrier according to the present invention applied to a wheel chair being one type of carrier. With the second embodiment, the construction of the controller for remote operation of the inclining device has been changed. Here construction the same as for the previous first embodiment is denoted by the same symbols and description is omitted.

That is to say, a controller 52 comprises a base plate 52a, a rotation drum 52b, a rotation dial 52c, and cable securing fittings 52d. The base plate 52a is provided on each of the outside portions of the left and right pair of frames 12L, 12R. The rotation drum 52b having a cylindrical shape is rotatably attached to the base plate 52a, with an inner wire 46b of a control cable 46 wound therearound. The rotation dial 52c is integrally attached to and concentric with the rotation drum 52b. The cable securing fittings 52d secure one end of the outer tube 46a of each control cable 46.

Next is a description of the operation of the auxiliary steering gear for a carrier according to the second embodiment.

When the rotation dial 52c is rotated in one direction, the rotation drum 52b rotates with the rotation of the rotation dial 52c. Then, the inner wire 46b of the control cable 46 wound around the rotation drum 52b is pulled in one direction due to the friction force of the rotation drum 52b. Therefore, the inner wire 46b slides inside the outer tubes 46a so that the pulley 44 of the inclining device 18 is rotated in accordance with the rotation angle of the rotation dial 52c. When the pulley 44 rotates, then as shown in FIG. 3 (B) the pinion 42 rotates as one with the pulley 44 so that the engagement position of the sector gear 40 which engages with the pinion 42 changes. Consequently, the movable arm 36 inclines relative to the fixed arm 32 about the incline support shaft 34 so that the sub wheel 16a inclines.

To incline the sub wheel 16a in the other direction, the rotation dial 52c can be turned in the other direction.

Figure 7:
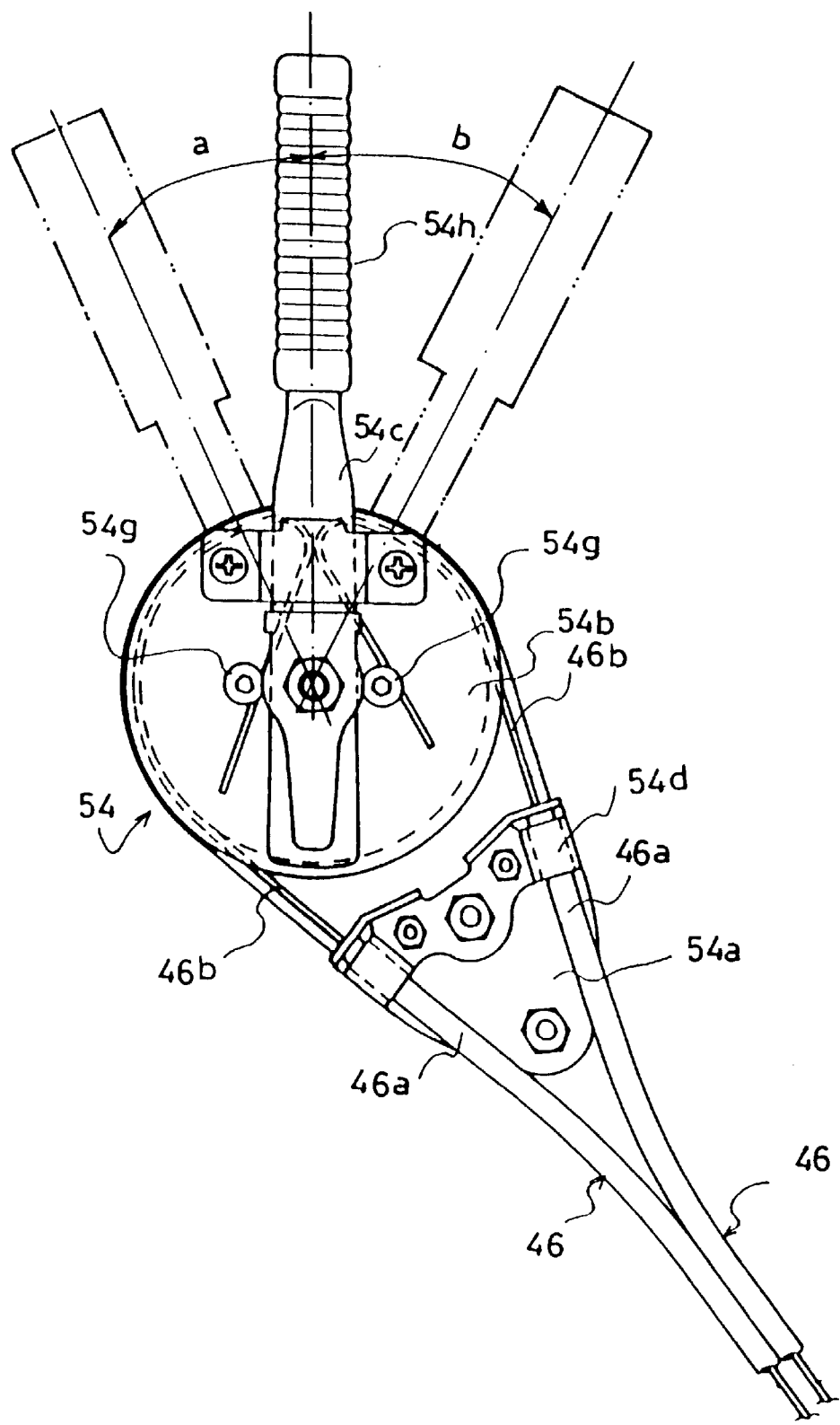
FIG. 7 is a detailed side view showing another embodiment of the controller shown in FIG. 6.
Figure 8:
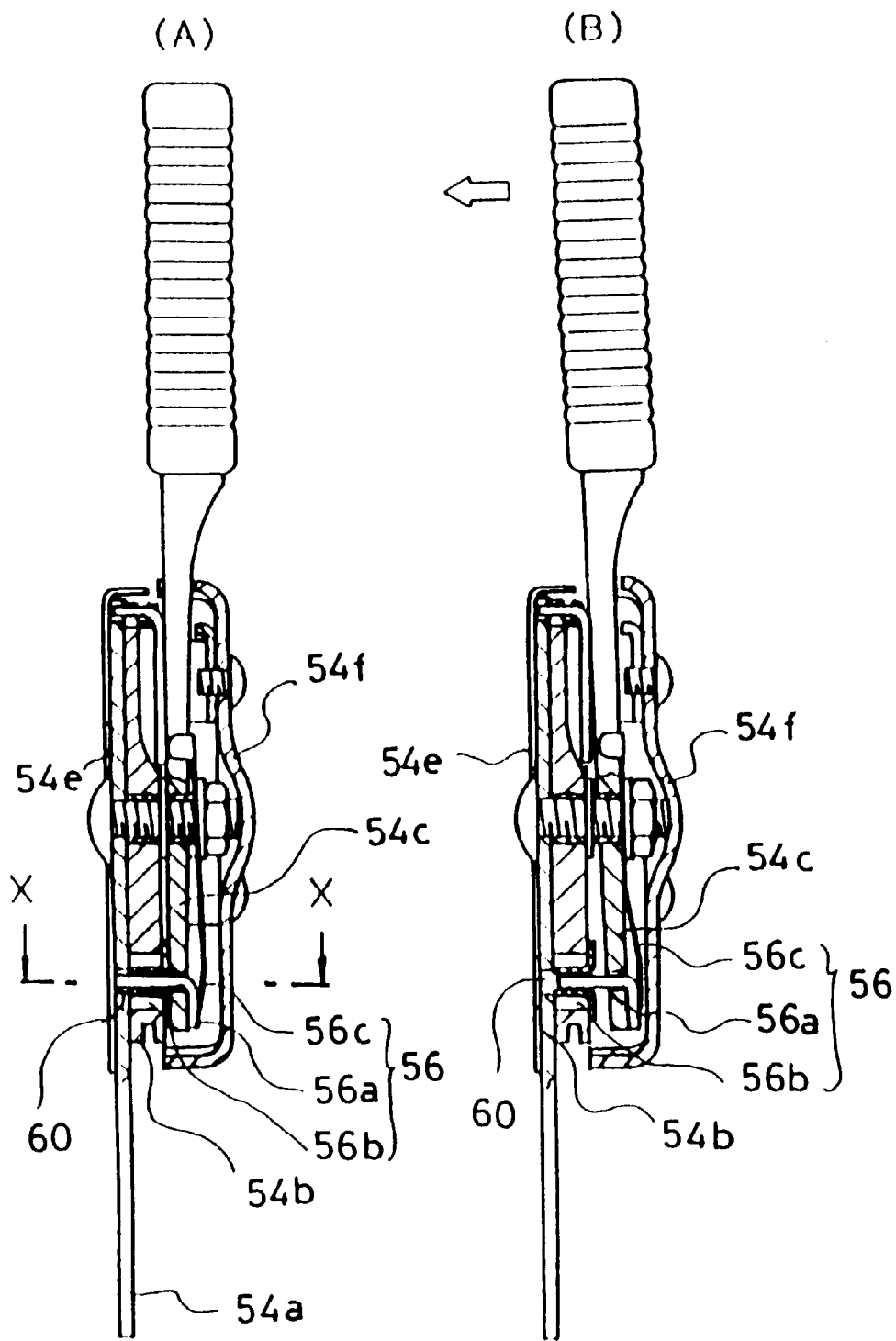
FIG. 8 shows a longitudinal sectional view of the controller shown in FIG. 7, (A) being a view of a condition in a neutral position, and (B) being a view of a condition when a stopper mechanism is released.
Figure 9:
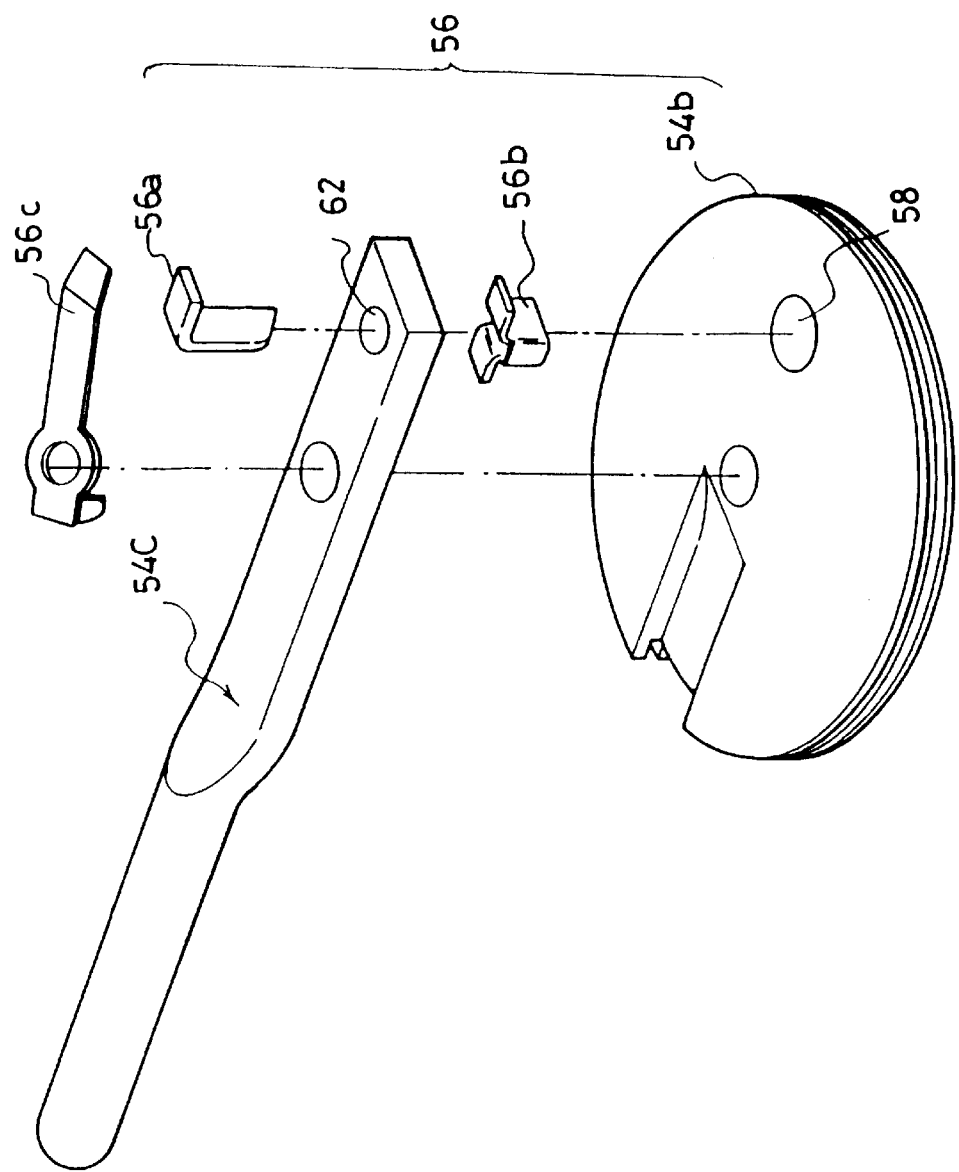
FIG. 9 is an exploded perspective view of the controller shown in FIG. 8.

FIG. 7 through FIG. 9 show another embodiment of the controller shown in FIG. 6. With this embodiment, the construction of the controller for remote operation of the inclining device has been changed. Construction the same as for the previous first and second embodiments is denoted by the same symbols and description is omitted.

That is to say, a controller 54 comprises a base plate 54a, a rotation drum 54b, an operating lever 54c, a cable securing fitting 54d, a stopper mechanism 56 (control device), a rear cover 54e, and a front cover 54f. The base plate 54a is provided on each of the outside portions of the left and right pair of frames 12L, 12R. The rotation drum 54b having a cylindrical shape is rotatably attached to the base plate 54a, with an inner wire 46b of a control cable 46 secured thereto. The operating lever 54c is integrally attached to the rotation drum 54b to apply the operating force. The cable securing fitting 54d secures one end of outer tube 46a of each control cable 46. The stopper mechanism 56 controls the operating direction of the operating lever 54c to one direction. The rear cover 54e covers a rear face of the base plate 54a. The front cover 54f covers the rotation drum 54b and the like attached to the base plate 54a.

As shown in FIG. 7, the inner wires 46b of the control cable 46, are wound approximately halfway around the periphery of the rotation drum 54b and the ends thereof then secured by means of wire securing screws 54g provided on the rear side of the rotation drum 54b.

A grip 54h made for example of a resilient material such as rubber is attached to the operating lever 54c to facilitate gripping of the operating lever 54c.

As shown in FIG. 8 and FIG. 9, the stopper mechanism 56 comprises a stopper 56a, a stopper guide 56b, and a plate spring 56c (urging device). The stopper 56a is formed in an approximate L-shape with an inclined portion formed on a tip end thereof. The stopper guide 56b controls the sliding direction of the stopper 56a. The plate spring 56c urges the stopper 56a towards the rotation drum 54b.

A receiving aperture 58 for receiving the stopper guide 56b is formed on the rotation drum 54b. Furthermore, an engagement aperture 60 for engaging a tip end of the stopper 56a is formed in the base plate 54a. The stopper 56a passes through a through hole 62 formed in a tip end portion of the operating lever 54c, and through the stopper guide 56b, and the tip end thereof engages with the engagement aperture 60 of the base plate 54a due to the urging force of the plate spring 56c. Here the receiving aperture 58 of the rotation drum 54b and the engagement aperture 60 of the base plate 54a, are formed so as to be aligned when the sub wheel 16a is at the neutral position.

Next is a description of the operation of the auxiliary steering gear for a carrier, of this construction.

When the wheel chair 10 travels along an even path, then if the left and right operating levers 54c are in the neutral position as shown in FIG. 8 (A), the incline angle of the sub wheels 16a is approximately zero. Therefore, a turning force due to the incline of the sub wheels 16a does not occur. Consequently, the wheel chair 10 travels in a straight line.

When the wheel chair 10 travels along a path where the right side with respect to the direction of travel is lower, then for example when a force is applied to operate the right side operating lever 54c to the left in FIG. 7 (counter clockwise rotation), the stopper 56a is pressed in the plate spring 56c direction due to the inclined portion formed on the tip end of the stopper 56a, so that the tip end of the stopper 56a disengages from the engagement aperture 60 against the urging force of the plate spring 56c. Consequently, the operating lever 54c turns to the left in FIG. 7 so that the inner wire 46b secured to the rotation drum 54b is pulled in one direction. As a result, the inclining device 18 is operated so that the sub wheel 16a is inclined to the left, by an angle corresponding to the operation amount of the operating lever 54c. Therefore the turning force due to the inclined surface is offset by the turning force due to the incline of the sub wheel 16a, so that the straight line travel performance of the wheel chair 10 is maintained.

When with such a construction the travelling path for the wheel chair 10 is even, then the operating lever 54c is operated to the right in FIG. 7 (clockwise rotation) so as to return the sub wheel 16a to the neutral position. Then, the incline of the sub wheel 16a is gradually reduced corresponding to the operation of the operating lever 54c, and when the operating lever 54c attains the neutral position, the tip end of the stopper 56a engages with the engagement aperture 60 due to the urging force of the plate spring 56c. In this case, if one attempts to operate the operating lever 54c further, since the tip side face of the stopper 56a abuts against the inner wall of the engagement aperture 60, the operating lever 54c is prevented from rotating further. Consequently, the operating lever 54c is automatically stopped at the neutral position, and there is no over operation.

Incidentally, in the case where it is desired to operate the right side operating lever 54c from the neutral position to the right in FIG. 7 (clockwise rotation), then as shown in FIG. 8 (B), if the operating lever 54c is pressed in the base plate 54a direction (to the left in the figure), then by the principle of levers, the tip end of the stopper 56a is disengaged from the engagement aperture 60. Consequently, if the operating lever 54c is operated in this condition, operation to the right in FIG. 7 is possible.

Here with the above description, when the wheel chair 10 travels along an incline surface where the right side is lower, only the operating lever 54c on the right side is operated. However it is also possible to operate the operating lever 54c on the left side to the right in FIG. 7 (clockwise rotation).

Furthermore, particularly when travelling along a path with a steep incline, one of the operating levers 54c may be operated in the range of use "a" in FIG. 7 and the other operating lever 54c may be operated in the range of use "b" in FIG. 7. If this is done, then due to the incline of the sub wheels 16a on both the left and the right of the wheel chair 10, a larger turning force is produced so that straight line travel performance of the wheel chair 10 can be maintained even in the case of a steep incline.

In short, with such a construction, by providing a stopper mechanism on the controller 54, over operation when the operating lever 54c returns to the neutral position is prevented, thus improving the operability of the inclining device.

Figure 10:
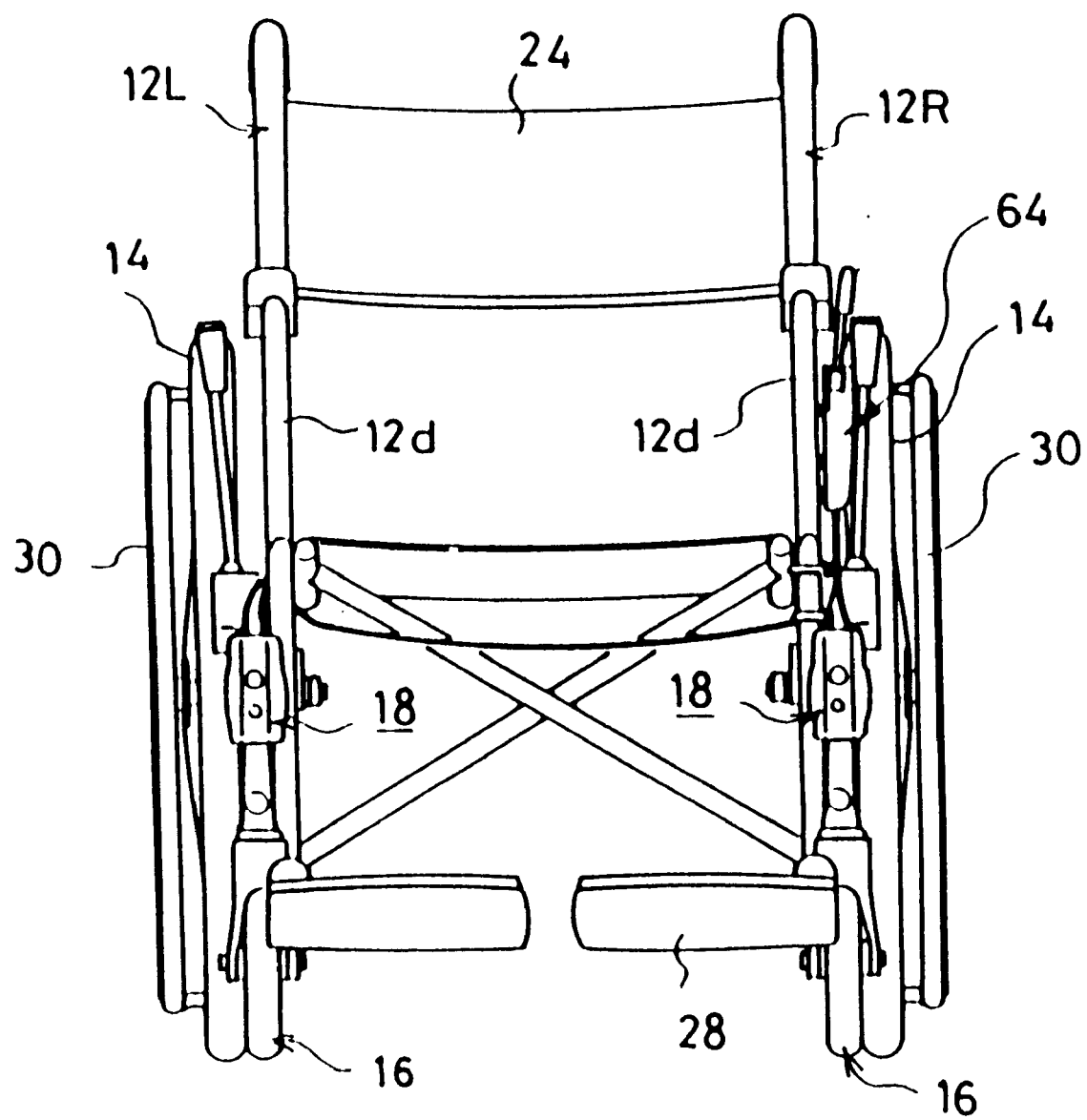
FIG. 10 is a front view of a wheel chair according to a third embodiment of the present invention.

FIG. 10 shows a third embodiment of the auxiliary steering gear for a carrier according to the present invention applied to a wheelchair being one type of carrier. With the third embodiment, the controller is improved, and also the left and right inclining device can be simultaneously remotely operated with a single controller. Here construction the same as for the previous first and second embodiments is denoted by the same symbols and description is omitted.

Figure 11:
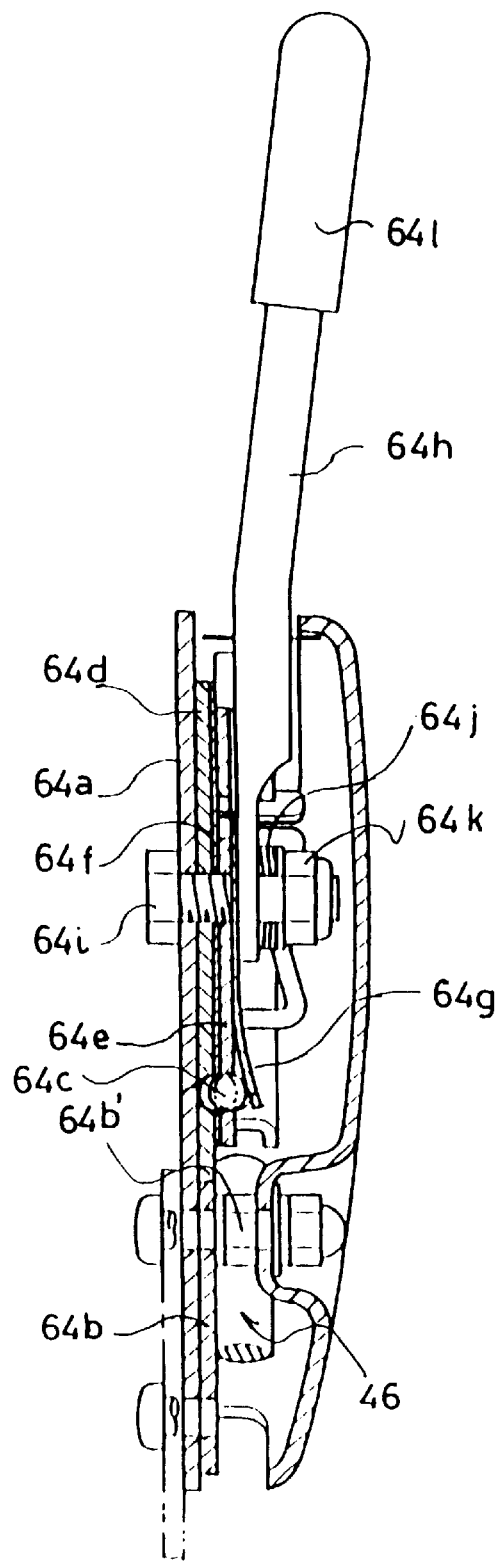
FIG. 11 is a longitudinal sectional view of a controller shown in FIG. 10.
Figure 12:
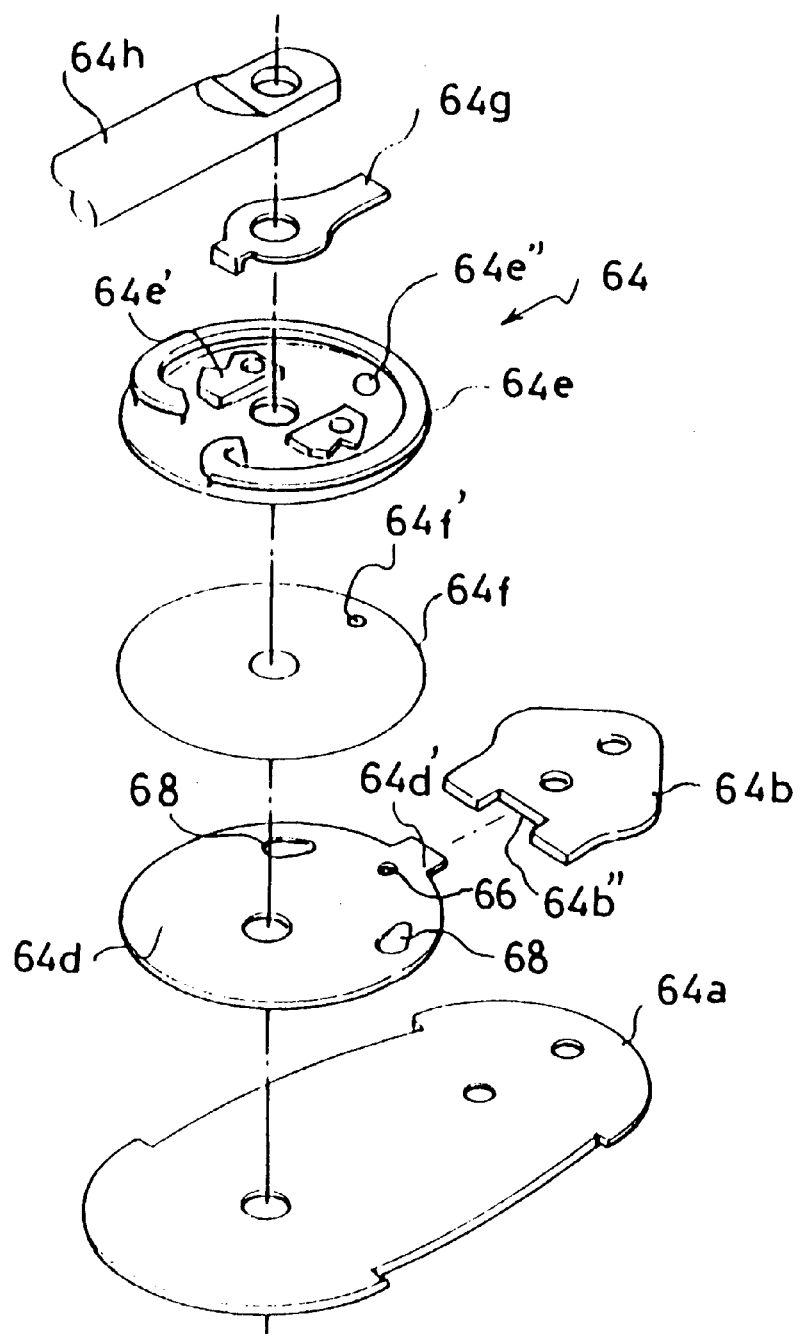
FIG. 12 is an exploded perspective view of the controller shown in FIG. 11.
Figure 13:
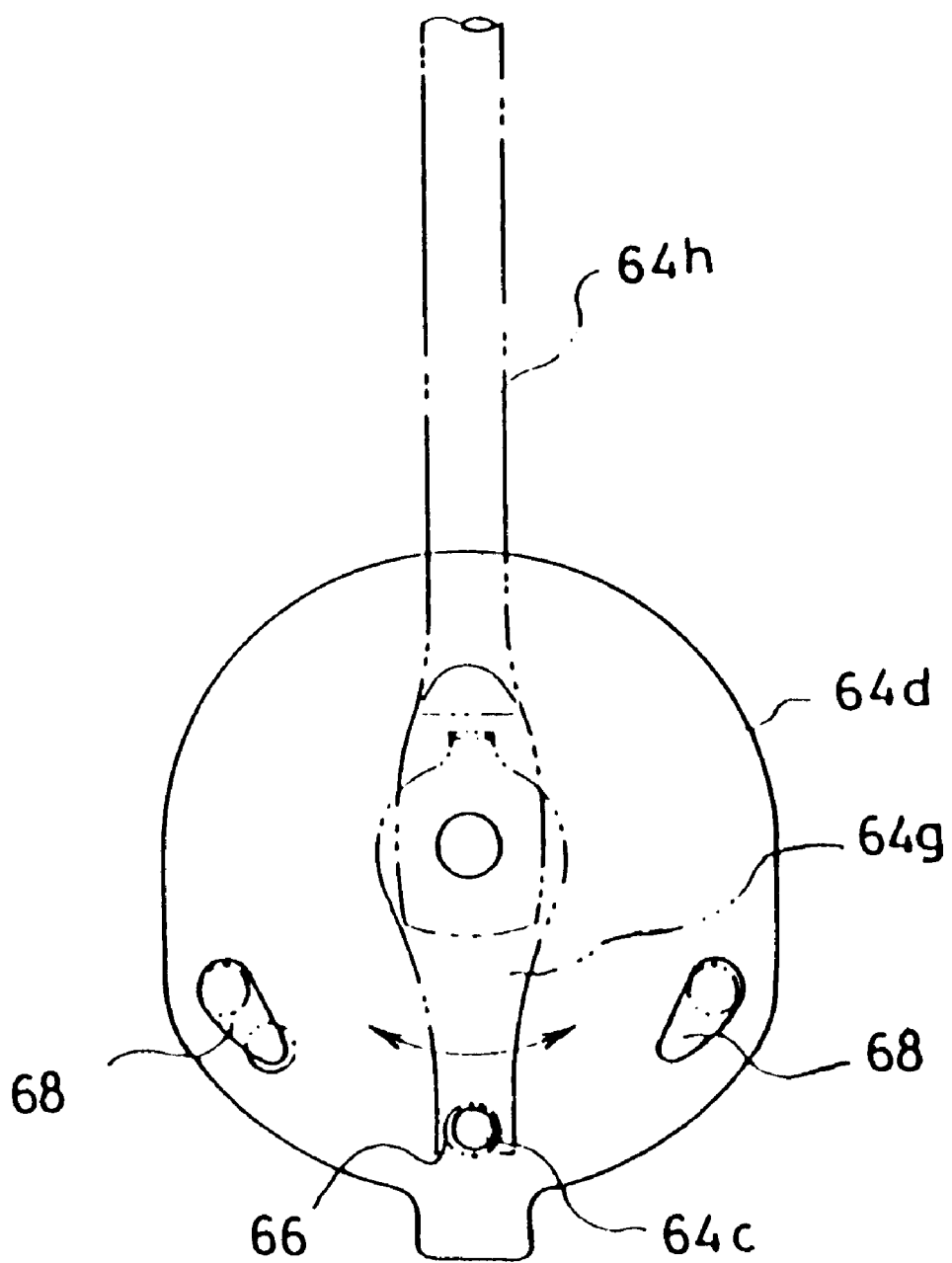
FIG. 13 is a detailed view of a ball receiving plate in the controller shown in FIG. 10.

That is to say, a controller 64 is attached to only one side of the main body frame (with this embodiment to only the frame 12R on the right side). The controller 64, as shown in FIG. 11 and FIG. 12 comprises; a base plate 64a, a cable securing plate 64b, a ball 64c, a ball receiving plate 64d, a rotor 64e, a friction plate 64f, a plate spring 64g (urging device), an operating lever 64h, a bolt 64i, a washer 64j and a nut 64k. The base plate 64a is attached to a carrier body 12. The cable securing plate 64b secures one end of a control cable 46. The ball receiving plate 64d receives the ball 64c which controls the neutral position and the operating range. The rotor 64e is attached so as to be freely rotatable relative to the base plate 64a, with an inner wire 46a of the control cable 46 secured thereto. The friction plate 64f produces friction between the rotor 64e and the ball receiving plate 64d. The plate spring 64g urges the ball 64c towards the ball receiving plate 64d. The operating lever 64h is attached integral with the rotor 64e, thereby applying operating force. The bolt 64i, washer 64j and nut 64k constitute the rotation shaft of the rotor 64e.

The cable securing plate 64b has a cable securing portion 64b' for securing one end of the control cable 46 from the inclining device 18, and is clamped to the base plate 64a by means of a clamping member such as a bolt. In the cable securing plate 64b is formed a cut out 64b" which engages a protrusion 64d' of the ball receiving plate 64d, to be described later.

The ball receiving plate 64d is an approximate disc shape, with the protrusion 64d' for engaging with the cut out 64b" of the cable securing plate 64b formed on the periphery. That is to say, by engaging the cut out 64b" of the cable securing plate 64b which is clamped to the base plate 64a, with the protrusion 64d' of the ball receiving plate 64d, then rotation of the ball receiving plate 64d is controlled. Furthermore, in the ball receiving plate 64d, as shown in FIG. 12, is formed a click stop aperture 66 for making known that the operating lever 64h is at the neutral position, and two stopper apertures 68 for controlling the operating range of the operating lever 64h. The respective stopper apertures 68 are formed with a small diameter on the click stop aperture 66 side and a large diameter on the opposite side.

The friction plate 64f is an approximate disc shape, with an aperture 64f' for accommodating the ball 64c, formed therein.

Figure 14:
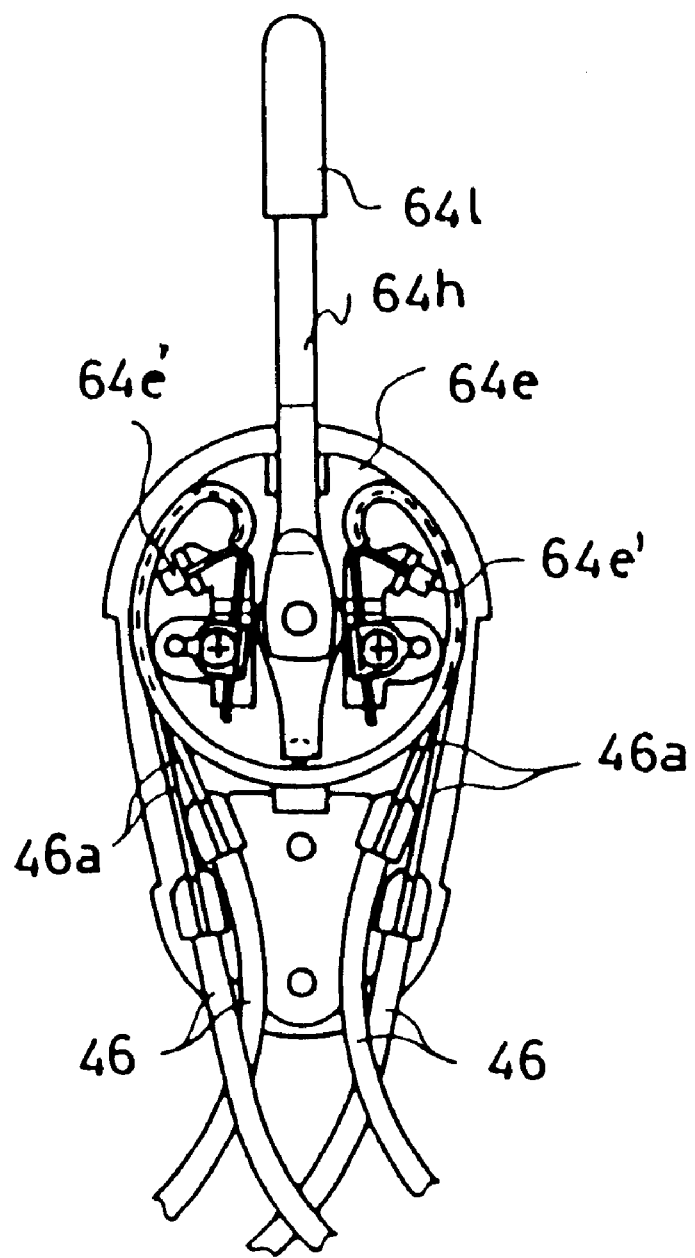
FIG. 14 illustrates a side view of a condition in a neutral position with a front cover removed showing an operation of the controller shown in FIG. 10.

The rotor 64e is an approximate disc shape, and secures one end of the inner wire 46a of the control cable 46. That is to say, as shown in FIG. 14, two inner wires 46a for remotely operating one of the inclining devices 18 are wound around the periphery of the rotor 64e from both sides thereof, with their ends secured to wire stoppers 64e' formed on the rotor 64e. Furthermore, two inner wires 46a for remotely operating the other inclining device 18 are similarly secured to the wire stoppers 64e' formed on the rotor 64e. Here, the inner wires 46a are secured to the rotor 64e such that the left and right inclining devices 18 are inclined in the same direction by rotation of the rotor 64e. Here the rotor 64e is also formed with an aperture 64e" for accommodating the ball 64c.

The plate spring 64g urges the ball 64c protruding from the respective apertures 64f', 64e" of the friction plate 64f and the rotor 64e, towards the ball receiving plate 64d.

With the operating lever 64h, as with the beforementioned second embodiment, a grip 64l made for example of a resilient material such as rubber is attached thereto to facilitate gripping of the operating lever 64h.

Next is a description of the operation of the auxiliary steering gear for a carrier according to the third embodiment.

When the operating lever 64h is in the neutral position, the ball 64c is in the click stop aperture 66.

When the operating lever 64h is operated, the ball 64c slips out of the click stop aperture 66 against the urging force of the plate spring 64g, giving a light impact to the operating lever 64h. Then, the rotor 64e integrally secured to the operating lever 64h is rotated so that the inner wires 46a of the control cable 46 are pulled in one direction. Consequently, the left and right inclining devices 18 are simultaneously operated in accordance with the operating amount of the operating lever 64h, thus inclining the sub wheels 16a.

On further operation of the operating lever 64h, the ball 64c falls into the stopper aperture 68 so that movement of the ball 64c is prevented by the large diameter portion of the stopper aperture 68. That is to say, the operating range of the operating lever 64h is controlled by the stopper aperture 68. Here, with the third embodiment, since with the stopper aperture 68, the click stop aperture 66 side is formed with a small diameter and the opposite side is formed with a large diameter, then the ball 64c can be guided smoothly into the stopper aperture 68, enabling the stopping of the operation of the operating lever 64h to be performed smoothly.

When the operating lever 64h is returned to the neutral position, the ball 64c falls into the click stop aperture 66 in the neutral position due to the urging force of the plate spring 64g, and a light impact is felt on the operating lever 64h. The operator can thus be aware that the operating lever 64h is in the neutral position, thus enabling improvement in the operability.

Concerning the operation and effect of the auxiliary steering gear for a carrier, since this is the same as for the previous first and second embodiments, description will be omitted.

Figure 15:
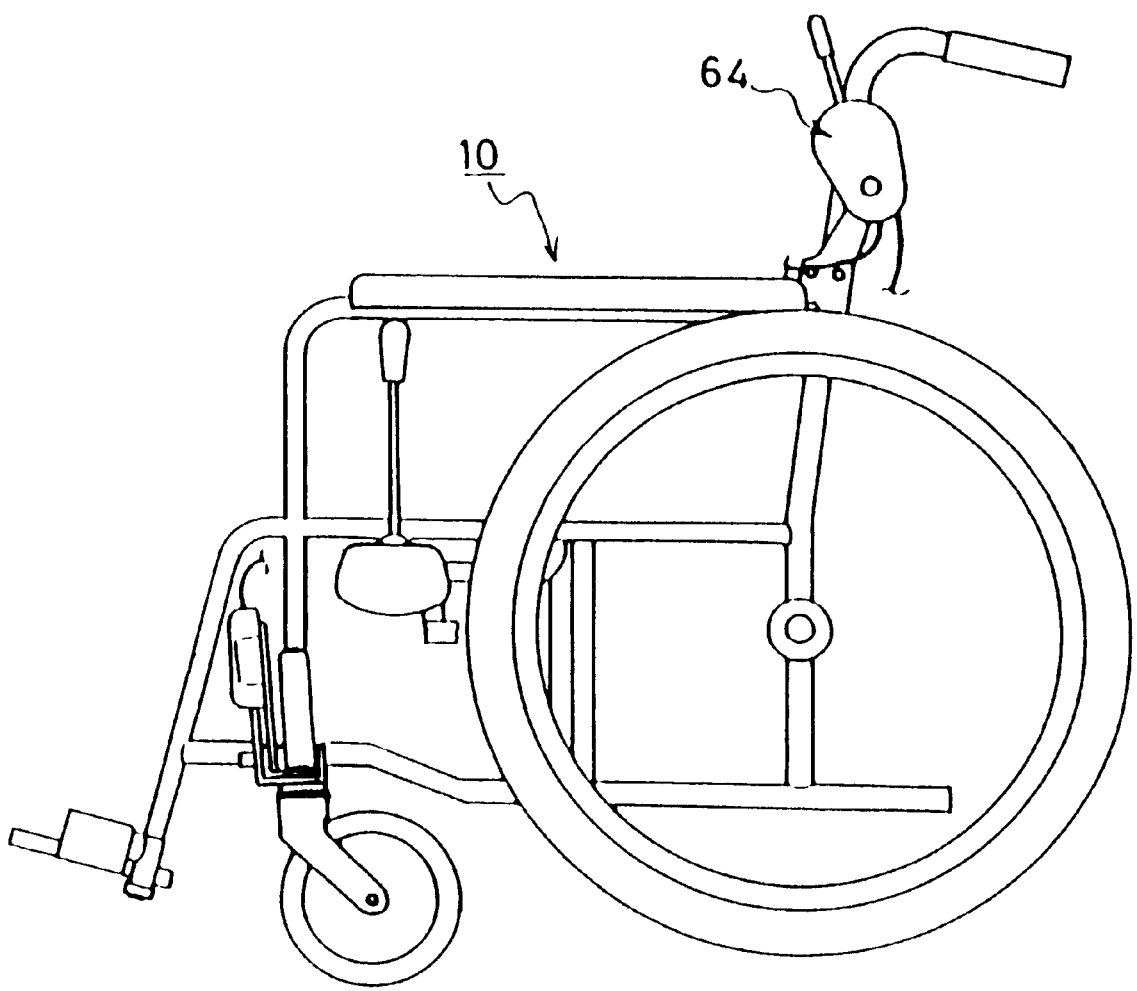
FIG. 15 is a side view showing a fourth embodiment of the present invention with a controller attached to a wheel chair rear portion.

With the above described first through third embodiments, it was assumed that the wheel chair was moved by the occupant. However, in the case where an assistant pushes the wheelchair 10, then as shown for a fourth embodiment in FIG. 15, the controller 20, 52, 54 or 64 may be provided on a rear portion of the wheel chair 10.

Figure 16:
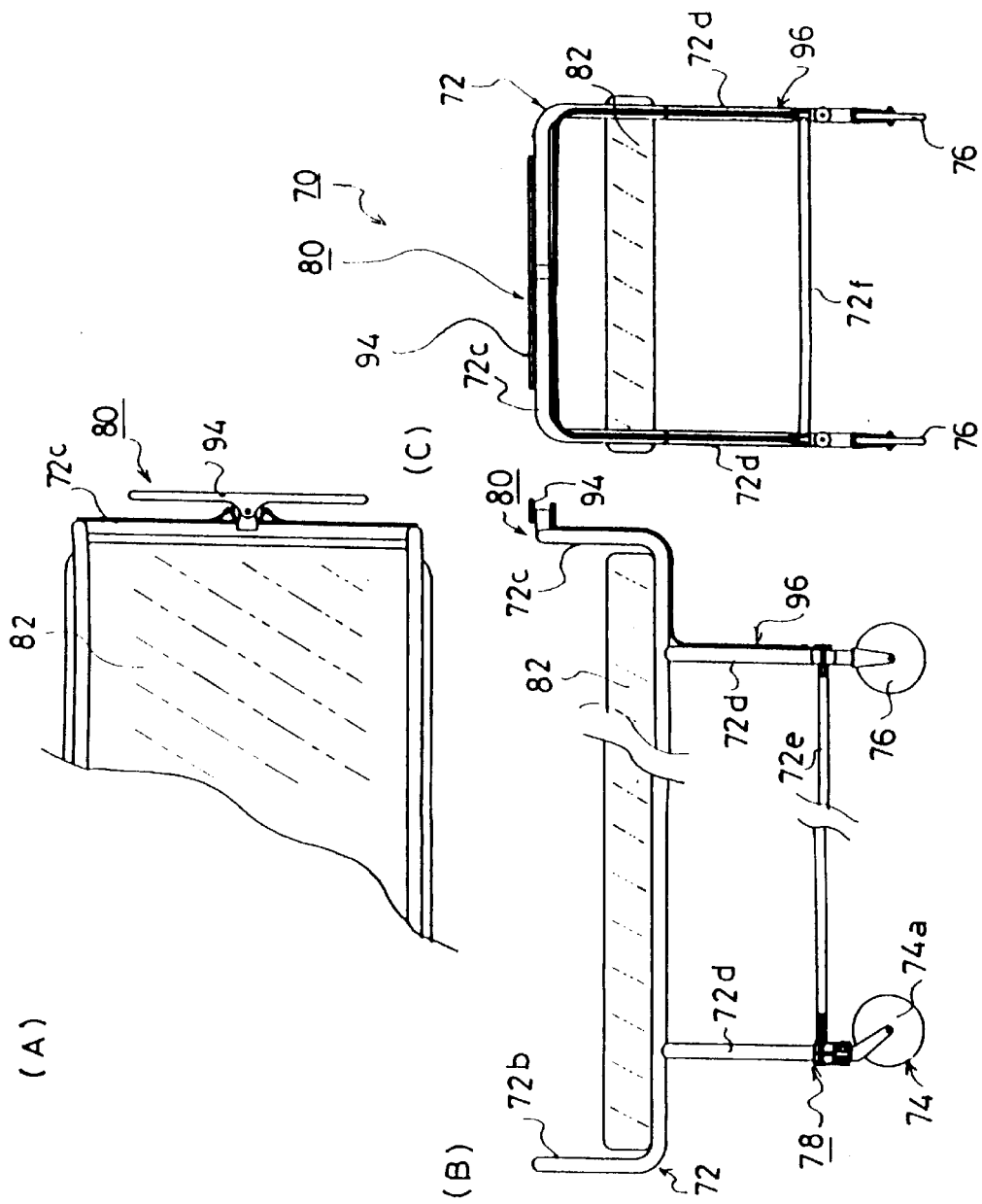
FIG. 16 shows a stretcher according to a fifth embodiment of the present invention, (A) being a plan view, (B) being a side view and (C) being a rear view.

FIG. 16 shows an overall construction of a fifth embodiment of the auxiliary steering gear for a carrier according to the present invention applied to a stretcher being one type of carrier, for transporting a patient in a hospital or the like.

That is to say, a stretcher 70 comprises a carrier body 72 serving as a frame, caster wheel devices 74, fixed wheel devices 76, inclining devices 78, and a control device 80. A mattress 82 is laid on the carrier body 72. The caster wheel devices 74 are respectively provided on the left and right front portions of the carrier body 72. The fixed wheel devices 76 are respectively provided on the left and right rear portions of the carrier body 72. The inclining devices 78 incline sub wheels 74a of the caster wheel devices 74 in a transverse direction with respect to the direction of travel of the carrier body 72. The control device 80 remotely operates the inclining devices 78.

The carrier body 72 comprises side frames 72a, a front frame 72b, a back frame 72c, a cross frame (not shown in the figure), leg frames 72d, and stiffening frames 72e and 72f. The side frames 72a are positioned on the left and right in the longitudinal direction of the mattress 82, with the longitudinal axes thereof extending approximately horizontally. The front frame 72b and the back frame 72c are approximately C-shaped and are connected approximately at right angles to opposite ends of the side frames 72a. The cross frame connects between the left and right side frames 72a, and supports a lower face of the mattress 82. The leg frames 72d are connected to lower portions of the side frames 72a, with the longitudinal axis thereof extending approximately vertically. The stiffening frames 72e and 72f connect adjacent leg frames 72d to each other. Furthermore, the caster wheel devices 74 are attached to the lower ends of the front leg frames 72d, and the fixed wheel devices 76 are attached to the rear leg frames 72d.

Figure 17:
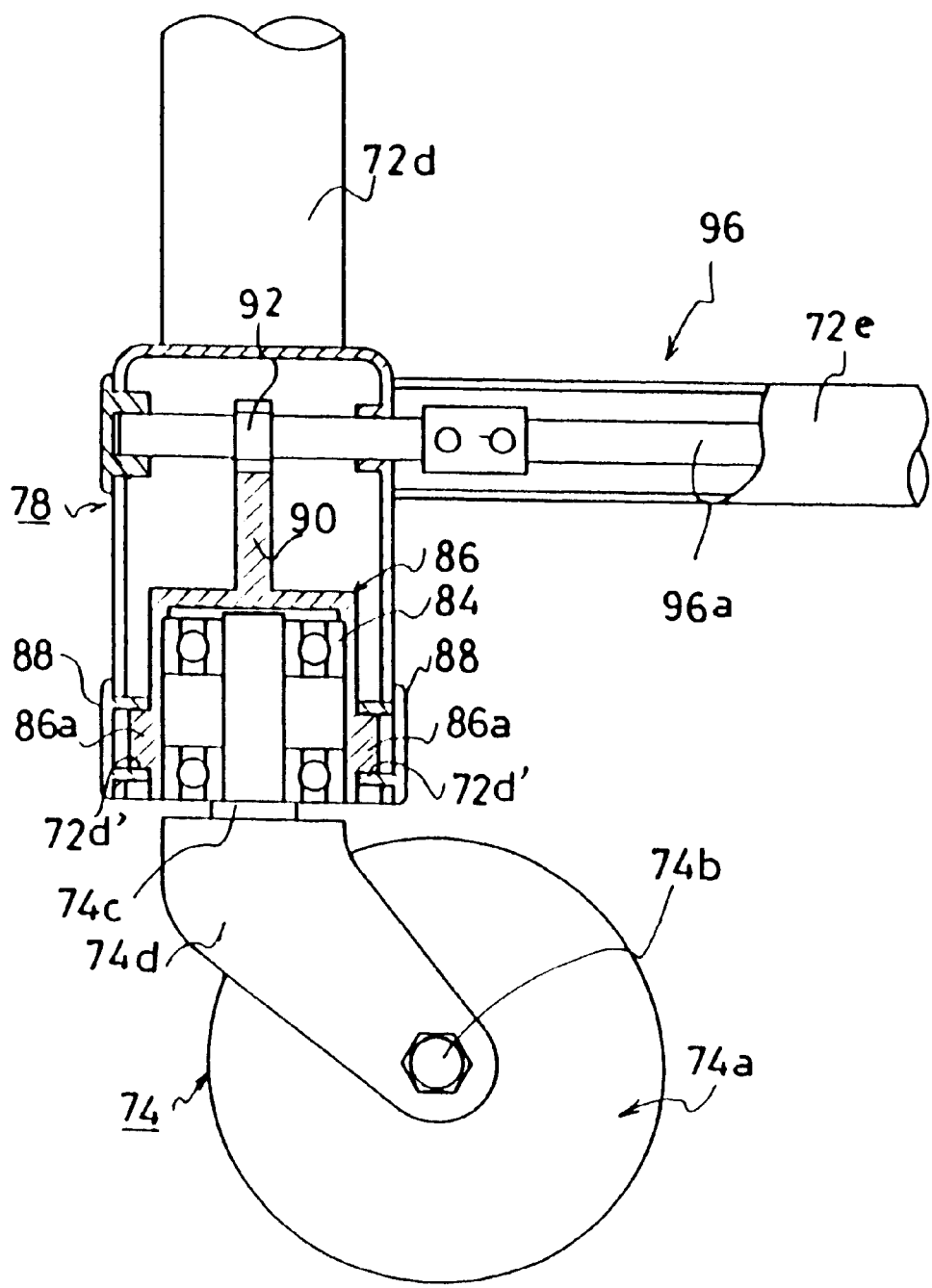
FIG. 17 is a cut away side view of an inclining apparatus shown in FIG. 16.

The caster wheel devices 74, as shown in FIG. 17, each comprise a sub wheel 74a, and a yolk 74d which essentially connects the sub wheel 74a to a lower portion of the leg frame 72d of the carrier body 72 while axially supporting the sub wheel 74a so as to be freely rotatable about a horizontal axle 74b and a vertical shaft 74c. Furthermore, with the sub wheel 74a, the direction thereof about the vertical shaft 74c changes in accordance with the direction of travel of the stretcher 70.

Figure 18:
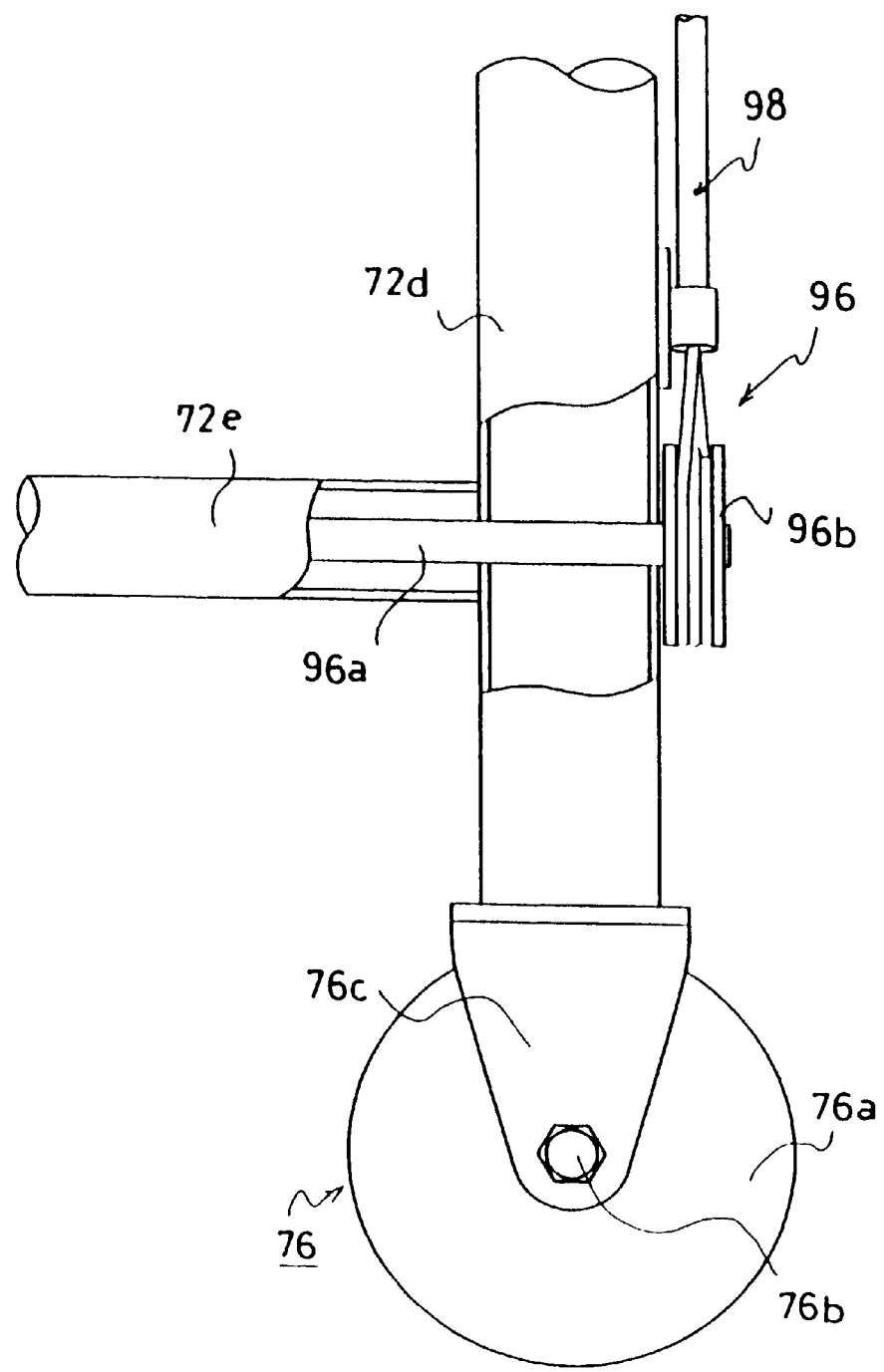
FIG. 18 is a cut away side view of an operating force transmission mechanism shown in FIG. 17.

The fixed wheel devices 76, as shown in FIG. 18, each comprises a wheel 76a, and a yolk 76c which essentially connects the wheel 76a to a lower portion of the leg frame 72d of the carrier body 72 while axially supporting the wheel 76a so as to be freely rotatable about a horizontal axle 76b.

The inclining devices 78, as shown in FIG. 17, are provided on the lower ends of the front leg frames 72d. That is to say, the yoke 74d of the caster wheel device 74 is rotatably attached to the leg frame 72d by means of a bearing 84. A bearing holder 86 serving as an incline support device which retains the bearing 84, is formed with respective shafts 86a extending towards the front and rear of the stretcher 70, which are axially supported by shaft supports 88 fitted into apertures 72d' formed in the leg frame 72d. A sector gear 90 is formed on an upper portion of the bearing holder 86. A pinion 92 is engaged with the gear 90.

By rotating the pinion 92, the engagement position between the pinion 92 and the gear 90 changes, and the sub wheel 74a is inclined about the shafts 86a.

The control device 80 comprises a rod shaped control lever 94 serving as an operating force applying device, and a transmission mechanism 96 serving as a transmission device. The transmission mechanism 96 transmits the operating force applied to the control lever 94 to the inclining devices 78. The control lever 94, as shown in FIG. 16 is attached to the upper portion of the back frame 72c of the stretcher 70 so as to be able to tilt freely.

Here the remote operation device includes the control lever 94 and the transmission mechanism 96.

The transmission mechanism 96, as shown in FIG. 17 and FIG. 18, comprises a transmission shaft 96a, a pulley 96b and a control cable 98. The transmission shaft 96a is attached concentric with the pinion 92 of the inclining device 78, passing through the left and right stiffening frames 72e. The pulley 96b is attached to one end of the transmission shaft 96a. The control cable 98 transmits the operating force applied to the control lever 94 to the left and right pulleys 96b.

When the stretcher 70 travels along an inclined surface, or is being turned, if the operator pushing the stretcher 70 operates the control lever 94, then the operating force is transmitted to the left and right pulleys 96b via the control cable 98. The operating force transmitted to the pulleys 96b is transmitted to the pinions 92 via the transmission shafts 96a, so that the pinions 92 are turned corresponding to the operation amount of the control lever 94. Due to turning of the pinions 92, the engagement position between the pinions 92 and the gears 90 engaged therewith changes so that the sub wheels 74a are inclined about the shafts 86a. When the sub wheels 74a incline, a centripetal acceleration is produced in the incline direction, thus producing a turning force.

Consequently, when the stretcher 70 travels along an incline surface, the turning force due to the incline surface is offset by the turning force due to the incline of the sub wheels 74a so that the straight line travel performance of the stretcher 70 can be maintained. Furthermore, when the stretcher 70 is turned, if prior to turning the control lever 94 is operated to produce a turning force due to the incline of the sub wheel 74a, turning of the stretcher 70 is facilitated, and hence the effort involved in handling the stretcher 70 is reduced.

Figure 19:
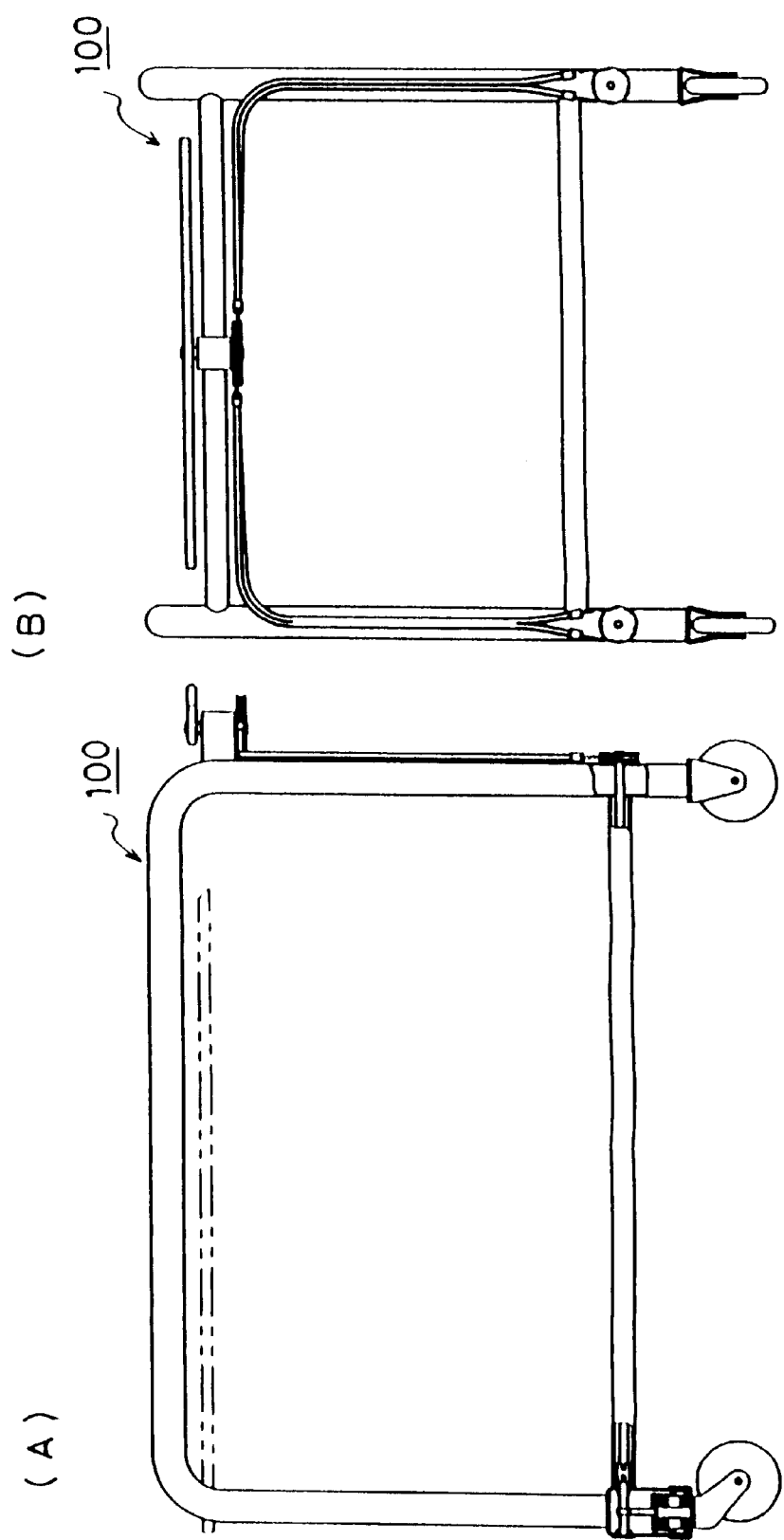
FIG. 19 shows a wagon according to a sixth embodiment of the present invention, (A) being a side view, (B) being a rear view.

FIG. 19 shows an overall construction of a sixth embodiment of the auxiliary steering gear for a carrier according to the present invention applied to a wagon being one type of carrier, for transporting food in a restaurant or the like.

The construction of a wagon 100 in the sixth embodiment is similar to the construction of the previous stretcher 70, and hence description is omitted. Furthermore, the operation and the effect of the wagon 100 in the sixth embodiment, is substantially the same as for the previous stretcher 70, the only difference being in the objects being transported.

FIG. 20 shows another embodiment where the inclining device in the auxiliary steering gear for a carrier according to the present invention, is driven by an electric motor. Here construction the same as for the inclining device of the previous first embodiment is denoted by the same symbols and description is omitted.

That is to say, a pinion 42 is driven by an electric motor 110. Furthermore, the turning force of the pinion 42 is transmitted to a gear 40 via intermediate gears 112 and 114. If in this way the turning force of the pinion 42 is transmitted to the gear 40 via the intermediate gears 112 and 114, the degree of freedom in setting the reduction ratio is improved. Consequently even if a low power output electric motor 110 is used, sufficient incline driving force for inclining the sub wheels 16a is produced, enabling miniaturization of the electric motor 110.

The control system of the electric motor 110, as shown in FIG. 21, comprises an operating lever 116 serving as an operating force applying device, a control unit 118, and a power source 120. The operating lever 116 directs the inclining of the caster wheel devices 16. The control unit 118 incorporates a microcomputer, and drive controls the left and right electric motors 110 in accordance with operation carried out by the operating lever 116. The power source 120 is for example a battery or the like, mounted on the carrier body 12, for supplying electricity to the control unit 118 and the electric motors 110.

Here the remote operation device includes the operating lever 116 and the control unit 118.

Furthermore, since with the left and right electric motors 110, synchronized rotation in the same direction is necessary, an encoder for detecting the rotation angle is incorporated. The rotation angle output from the encoder is input to the control unit 118. The control unit 118 then increases or decreases the current to be supplied to the electric motors 110 based on the input rotation angle, to give synchronization of the left and right electric motors 110.

Here with the present embodiment, the operating lever 116 is a single lever. The construction may however be such that this comprises for example two buttons for left and right inclination of the caster wheel devices 16.

Next is a description of the operation of the inclining device of such a construction.

When the operating lever 116 is moved over in one direction, a current is supplied from the control unit 118 to the electric motors 110. As a result the electric motors 110 are operated and the pinions 42 rotate. The rotation of the pinions 42 is transmitted to the gears 40 via the intermediate gears 112 and 114. Therefore, the movable arms 36 start to incline and the sub wheels 16a incline.

When the incline angles of the sub wheels 16a attain desired angles, the operating lever 116 is released and the current supply to the electric motors 110 is stopped, thus stopping the electric motors 110. That is to say, as a result of the sub wheels 16a attaining the desired incline angles, a turning force is produced in the incline direction, thus enabling an improvement in the straight line travel performance and in the turning performance.

Furthermore, when desired to return the sub wheels 16a to the neutral position, the operating lever 116 is moved over in the other direction so that the sub wheels start to incline in the opposite direction to before. Then once the sub wheels 16a attain the approximate neutral position, the operating lever 116 is released and the sub wheels 16a stop at the neutral position.

Concerning other operations and effects, since these are the same as for the previous first through sixth embodiments, description will be omitted.

With the above described constructions, the operating force applied to the controller 20 etc. is transmitted to the inclining devices 18, 78 via the control cable 46. The construction may however be such that this is transmitted to the inclining devices 18, 78 by a mechanical device such as a link.

Industrial Field of Application

As described above, by applying the auxiliary steering gear for a carrier according to the present invention to a wheelchair, a stretcher or a wagon etc., being one type of carrier, the straight line travel performance of the carrier can be maintained irrespective of the slope of the path, and also the turning performance can be improved. In the present case, since a gear device is used as a mechanism for inclining the sub wheel of the caster wheel device, the sub wheel can be inclined with high mechanical efficiency and a small operating force. Consequently, the operability of the carrier can be considerably improved, giving an extremely useful product.

What is claimed is:

1. An auxiliary steering gear for a carrier incorporating a caster wheel device comprising;

a carrier body (12, 70, 100) incorporating a main wheel (14, 76), a caster wheel device (16, 74) including a sub wheel (16a, 74a) and a sub wheel support device which essentially connects said sub wheel (16a, 74a) to said carrier body (12, 70, 100) while supporting said sub wheel (16a, 74a) so as to be freely rotatable about a horizontal axle (16b, 74b) and a vertical shaft (16c, 74c), an inclining device (18, 78) for enabling inclining of said sub wheel (16a, 74a) in a transverse direction with respect to a direction of travel of said carrier body (12, 70, 100), and a remote operation device (20, 46, 52, 54, 64, 94, 96, 116, 118) for remote operation of said inclining device (18, 78), wherein said inclining device (18, 78) comprises an incline support device (36, 86) for inclinably connecting said caster wheel device (16, 74) to said carrier body (12, 70, 100) by means of an incline support shaft (34, 86a) which extends in a direction of travel of said carrier body (12, 70, 100), and a gear device (38) for transmitting an incline drive force to incline said caster wheel device (16, 74), and said gear device (38) is set with a large gear ratio for reducing a reaction force due to external forces acting on said sub wheel (16a, 74a), and said remote operation device (20, 46, 52, 54, 64, 94, 96, 116, 118) is for remotely driving said gear device (38).

2. An auxiliary steering gear for a carrier incorporating a caster wheel device according to claim 1, wherein said sub wheel support device comprises; a sub wheel support member (16d, 74d) for rotatably supporting said sub wheel (16a, 74a) via said horizontal axle (16b, 74b), and a vertical shaft bearing device having said vertical shaft (16c, 74c) with one essentially connected to said support member (16d, 74d) and the other essentially connected to said carrier body (12, 70, 100), and a bearing member (36b, 84).

3. An auxiliary steering gear for a carrier incorporating a caster wheel device according to claim 2, wherein said incline support device (36, 86) comprises an extension member (36a) which is formed by extending one of the vertical shaft (16c, 74c) and the bearing member (36b, 84) of said vertical shaft bearing device essentially connected to said carrier body (12, 70, 100), and said extension member (36a) is inclinably connected to said carrier body (12, 70, 100), by means of said incline support shaft (34, 86a).

4. An auxiliary steering gear for a carrier incorporating a caster wheel device according to claim 3, wherein said gear device (38) comprises a first gear mechanism (40) provided on the caster wheel device (16, 74) or the extension member (36a) thereof, and a second gear mechanism (42) provided on said carrier body (12, 70, 100) for engaging with said first gear mechanism (40), and said remote operation device (20, 46, 52, 54, 64, 94, 96) is a means for rotational drive of said second gear mechanism (42).

5. An auxiliary steering gear for a carrier incorporating a caster wheel device according to claim 4, wherein the second gear mechanism (42) of said gear device (38) is a pinion.

6. An auxiliary steering gear for a carrier incorporating a caster wheel device according to claim 4, wherein said remote operation device (116, 118) controls an electric motor (110) to thereby drive said second gear mechanism (42).

7. An auxiliary steering gear for a carrier incorporating a caster wheel device according to claim 1, wherein said remote operation device (20, 46, 52, 54, 64, 94, 96) comprises an operating force applying device (20, 52, 54, 64, 94) for converting the applied operating force into said incline drive force, and a transmission device (46, 96) for mechanically transmitting the converted incline drive force to said gear device (38).

8. An auxiliary steering gear for a carrier incorporating a caster wheel device according to claim 7, wherein said transmission device (46) is a cable.

9. An auxiliary steering gear for a carrier incorporating a caster wheel device according to claim 8, wherein said operating force applying device (20, 52, 54, 64, 94) is a slider (20c) with one end of said cable (46) secured thereto, and which slides approximately linearly.

10. An auxiliary steering gear for a carrier incorporating a caster wheel device according to claim 8, wherein said operating force applying device (20, 52, 54, 64, 94) is a rotation dial (52c) with one end of said cable (46) secured thereto, and which is rotatably attached to said carrier body (12, 70, 100).

11. An auxiliary steering gear for a carrier incorporating a caster wheel device according to claim 8, wherein said operating force applying device (20, 52, 54, 64, 94) comprises an approximately cylindrical rotation drum (54b) with one end of said cable (46) secured thereto, and which is rotatably attached to said carrier body (12, 70, 100), an operating lever (54c) secured integral with said rotation drum (54b) for applying an operating force, and control means (56) for controlling the operating direction of said operating lever (54c) to one direction.

12. An auxiliary steering gear for a carrier incorporating a caster wheel device according to claim 11, wherein said control means (56) comprises a stopper (56a) which passes through an aperture (62) formed in said operating lever (54c) so that a tip portion thereof is engaged with a fixed aperture (60) to thereby control the operation of said operating lever (54c), and urging means (56c) for urging said stopper (56a) towards said fixed aperture (60).

13. An auxiliary steering gear for a carrier incorporating a caster wheel device according to claim 12, wherein an incline portion inclined in one direction is formed on the tip portion of said stopper (56a).

14. An auxiliary steering gear for a carrier incorporating a caster wheel device according to claim 13, wherein a through hole (58) is formed in said rotation drum (54b) so that said stopper (56a) passes through said through hole (58), and a guide (56b) is provided in said through hole (58) for controlling a sliding direction of said stopper (56a).

15. An auxiliary steering gear for a carrier incorporating a caster wheel device according to claim 11, wherein a grip (54h) made from a resilient material is provided on said operating lever (54c).

16. An auxiliary steering gear for a carrier incorporating a caster wheel device according to claim 7, wherein said transmission device (46) is a link.

17. An auxiliary steering gear for a carrier incorporating a caster wheel device according to claim 1, wherein said remote operation device (20, 46, 52, 54, 64, 94, 96) simultaneously remotely operates a plurality of said inclining devices (18, 78) connected to said carrier body (12, 70, 100).

18. An auxiliary steering gear for a carrier incorporating a caster wheel device according to claim 17, wherein an operating force applying device (20, 52, 54, 64, 94) comprises; a rotor (64e) rotatably secured to said carrier body (12, 70, 100) with one end of a cable (46) secured thereto, an operating lever (64h) secured integral with said rotor (64e) for applying an operating force, a ball (64c) rotatably inserted in an aperture (64e") formed in said rotor (64e), and urging means (64g) for urging said ball (64c) towards a fixed aperture (66) such that when said operating lever (64h) is at a neutral position, a portion of said ball (64c) engages with said fixed aperture (66).

19. An auxiliary steering gear for a carrier incorporating a caster wheel device according to claim 18, wherein an engagement aperture (68) is formed in said operating force applying device (20, 52, 54, 64, 94) such that said ball (64c) is engaged with said engagement aperture (68) at a maximum operating condition of said operating lever (64h) to control an operating range of said operating lever (64h).

20. An auxiliary steering gear for a carrier incorporating a caster wheel device according to claim 19, wherein said engagement aperture (68) is formed with an engagement start portion with a small diameter and an engagement finish portion with a large diameter.

21. An auxiliary steering gear for a carrier incorporating a caster wheel device comprising;

a carrier body (12, 70, 100) incorporating a main wheel (14, 76), a caster wheel device (16, 74) including a sub wheel (16a, 74a) and a sub wheel support device which essentially connects said sub wheel (16a, 74a) to said carrier body (12, 70, 100) while supporting said sub wheel (16a, 74a) so as to be freely rotatable about a horizontal axle (16b, 74b) and a vertical shaft (16c, 74c), an inclining device (18, 78) for enabling inclining of said sub wheel (16a, 74a) in a transverse direction with respect to a direction of travel of said carrier body (12, 70, 100), and a remote operation device (20, 46, 52, 54, 64, 94, 96) for remote operation of said inclining device (18, 78), wherein said sub wheel support device comprises a sub wheel support member (16d, 74d) for rotatably supporting said sub wheel (16a, 74a) via said horizontal axle (16b, 74b), and a vertical shaft bearing device having said vertical shaft (16c, 74c) with one essentially connected to said support member (16d, 74d) and the other essentially connected to said carrier body (12, 70, 100), and a bearing member (36b, 84) and said inclining device (18, 78) comprises an incline support device (36, 86) for inclinably connecting said caster wheel device (16, 74) to said carrier body (12, 70, 100) by way of an incline support shaft (34, 86a) which extends in a direction of travel of said carrier body (12, 70, 100), and a gear device (38) for transmitting an incline drive force to incline said caster wheel device (16, 74), and said incline support device (36, 86) comprises an extension member (36a) which is formed by extending one of the vertical shaft (16c, 74c) and the bearing member (36b, 84) of said vertical shaft bearing device essentially connected to said carrier body (12, 70, 100), and said extension member (36a) is inclinably connected to said carrier body (12, 70, 100), by means of said incline support shaft (34, 86a), and said gear device (38) comprises a sector gear (40) provided on the caster wheel device (16, 74) or the extension member (36a) thereof, and a pinion (42) provided on said carrier body (12, 70, 100) and engaged with said sector gear (40), and said remote operation device (20, 46, 52, 54, 64, 94, 96) is a device for rotational drive of said pinion (42).

* * * * *